US011064405B2

(12) United States Patent
Centonza et al.

(10) Patent No.: US 11,064,405 B2
(45) Date of Patent: Jul. 13, 2021

(54) DELTA CONFIGURATION IN SPLIT CU-DU RAN ARCHITECTURE

(71) Applicant: Telefonaktiebolaget LM Ericsson (publ), Stockholm (SE)

(72) Inventors: Angelo Centonza, Stockholm (SE); Matteo Fiorani, Solna (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 16/323,879

(22) PCT Filed: Dec. 11, 2018

(86) PCT No.: PCT/SE2018/051271
§ 371 (c)(1),
(2) Date: Feb. 7, 2019

(87) PCT Pub. No.: WO2019/139517
PCT Pub. Date: Jul. 18, 2019

(65) Prior Publication Data
US 2020/0120559 A1 Apr. 16, 2020

Related U.S. Application Data

(60) Provisional application No. 62/616,912, filed on Jan. 12, 2018.

(51) Int. Cl.
*H04W 36/00* (2009.01)
*H04W 76/15* (2018.01)
(Continued)

(52) U.S. Cl.
CPC ... *H04W 36/0069* (2018.08); *H04W 36/0061* (2013.01); *H04W 36/0072* (2013.01);
(Continued)

(58) Field of Classification Search
CPC .......... H04W 28/085; H04W 36/0033; H04W 36/0061; H04W 36/0094; H04W 76/18;
(Continued)

(56) References Cited

U.S. PATENT DOCUMENTS

2013/0058245 A1* 3/2013 Van Lieshout ... H04W 36/0094
370/252
2018/0279182 A1* 9/2018 Sang ..................... H04L 5/0048
(Continued)

OTHER PUBLICATIONS

NG-RAN; 2017, 3GPP, Release 15, pp. 1-23 (Year: 2017).*
"3GPP TS 33.401 V14.5.0", 3rd Generation Partnership Project; Technical Specification Group Services and System Aspects; 3GPP System Architecture Evolution (SAE); Security architecture (Release 14), Jan. 2018, pp. 1-153.
(Continued)

*Primary Examiner* — Michael Thier
*Assistant Examiner* — Prince A Mensah
(74) *Attorney, Agent, or Firm* — Sage Patent Group

(57) ABSTRACT

Embodiments include exemplar)' methods and/or procedures performed by a central unit, CU, (110) that together with first and second distributed units, DUs (120, 130), comprise a node (100, 1160) of a wireless communication network. Embodiments include receiving (830) from the first DU, prior to occurrence of a first event concerning a user equipment, UE, (1110) that is in communication with the first DU, a lower-layer configuration of the UE. Embodiments also include storing (840) the lower-layer configuration of the UE, and sending (870), to the second DU, a setup request comprising the stored lower-layer configuration of the UE. Embodiments also include receiving (880), from the second DU, a setup response comprising a first delta configuration indicating one or more differences between a lower-layer configuration of the second DU and the stored lower-layer configuration. Embodiments also include sending (890), to the first DU, a modification request comprising the first delta configuration. Other embodiments include corresponding methods and/or procedures performed by first
(Continued)

or second DUs, as well as CUs or DUs configured to perform operations of the exemplary methods and/or procedures.

27 Claims, 14 Drawing Sheets

(51) Int. Cl.
    *H04W 76/27*      (2018.01)
    *H04W 36/06*      (2009.01)
    *H04W 80/02*      (2009.01)
    *H04W 88/08*      (2009.01)

(52) U.S. Cl.
    CPC ..... *H04W 36/00835* (2018.08); *H04W 36/06* (2013.01); *H04W 76/15* (2018.02); *H04W 76/27* (2018.02); *H04W 80/02* (2013.01); *H04W 88/085* (2013.01)

(58) Field of Classification Search
    CPC ......... H04W 36/0069; H04W 36/0072; H04W 36/00835; H04W 36/06; H04W 76/15; H04W 76/27; H04W 80/02; H04W 88/085
    See application file for complete search history.

(56) References Cited

U.S. PATENT DOCUMENTS

2018/0337846 A1* 11/2018 Lee ..................... H04W 28/085
2018/0376380 A1* 12/2018 Leroux ................ H04W 76/18

OTHER PUBLICATIONS

"3GPP TS 38.300 V0.6.0", 3rd Generation Partnership Project; Technical Specification Group Radio Access Network; NR; NR and NG-RAN Overall Description; Stage 2 (Release 15), Aug. 2017, pp. 1-59.

"3GPP TS 38.331 V15.0.0", 3rd Generation Partnership Project; Technical Specification Group Radio Access Network NR Radio Resource Control (RRC) protocol specification (Release 15), Dec. 2017, pp. 1-51.

"3GPP TS 23.501 V2.0.0"; 3rd Generation Partnership Project; Technical Specification Group Services and System Aspects; System Architecture for the 5G System; Stage 2 (Release 15), Dec. 2017, pp. 1-183.

"3GPP TR 38.801 V1.2.0", 3rd Generation Partnership Project; Technical Specification Group Radio Access Network; Study on New Radio Access Technology; Radio Access Architecture and Interfaces (Release 14), Feb. 2017, pp. 1-90.

"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.

"3GPP TS 37.340 V15.0.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2017, pp. 1-51.

"3GPP TS 38.401 V15.0.0", 3rd Generation Partnership Project; Technical Specification Group Radio Access Network;. NG-RAN; Architecture description (Release 15), Dec. 2017, pp. 1-23.

* cited by examiner

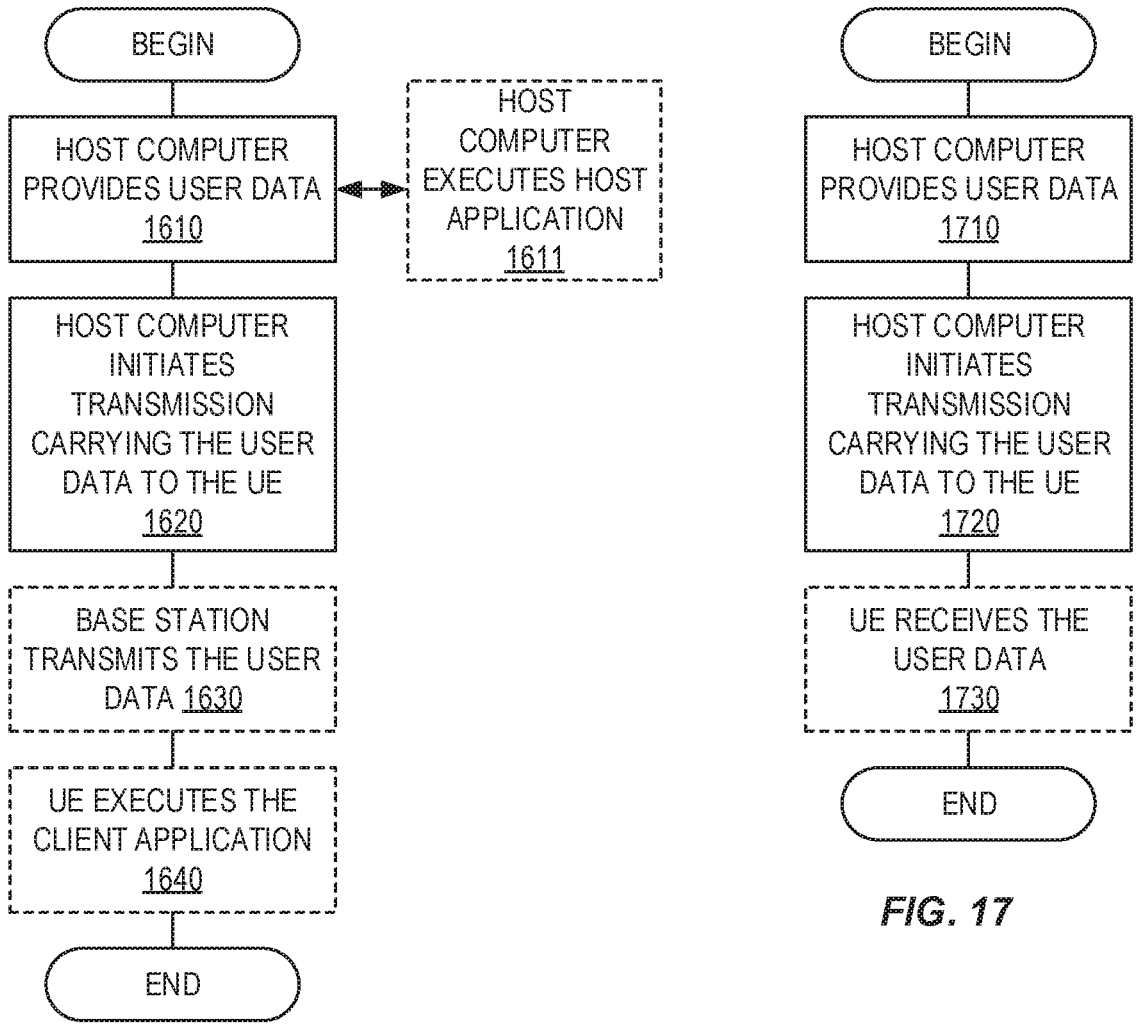

DELTA CONFIGURATION IN SPLIT CU-DU RAN ARCHITECTURE

TECHNICAL FIELD

The present application relates generally to the field of wireless communication networks and, more specifically, to radio access networks (RANs) in which base station functionality is split between central and distributed units.

INTRODUCTION

Multi-connectivity (also referred to as "Dual-Connectivity" or "DC") can be envisioned as an important feature for fifth-generation (5G) RAN architectures standardized by 3GPP. FIG. 1 illustrates a high-level view of the 5G network architecture, consisting of a Next Generation RAN (NG-RAN) and a 5G Core (5GC). The NG-RAN can comprise a set of gNodeB's (gNBs, including gNB 100) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The NG RAN logical nodes shown in FIG. 1 (and described in TR38.801 v1.2.0) include a Central Unit (CU or gNB-CU) and one or more Distributed Units (DU or gNB-DU). For example, gNB 100 includes CU 110 and DUs 120 and 130. A CU can host higher-layer protocols and can include a number of gNB functions, such as controlling the operation of DUs. A DU can host lower layer protocols and can include, depending on the functional split option, various subsets of the gNB functions. Note that in the following description, the terms "central unit" and "centralized unit" are used interchangeably, and the terms "distributed unit" and "decentralized unit" are also used interchangeability.

The NG, Xn-C and F1 items shown in FIG. 1 are logical interfaces. For NG-RAN, the NG and Xn-C interfaces for a split gNB (e.g., consisting of a gNB-CU and one or more gNB-DUs) terminate in the gNB-CU. Likewise, for EN-DC, the S1-U and X2-C interfaces for a split gNB terminate in the gNB-CU. The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, the F1 interface between the gNB-CU and gNB-DU is specified, or based on, the following general principles:
  F1 is an open interface;
  F1 supports the exchange of signaling information between respective endpoints, as well as data transmission to the respective endpoints;
  from a logical standpoint, F1 is a point-to-point interface between the endpoints (even in the absence of a physical direct connection between the endpoints);
  F1 supports control plane (CP) and user plane (UP) separation, such that a gNB-CU may be separated in CP and UP;
  F1 separates Radio Network Layer (RNL) and Transport Network Layer (TNL);
  F1 enables exchange of user-equipment (UE) associated information and non-UE associated information;
  F1 is defined to be future proof with respect to new requirements, services, and functions;
  A gNB terminates X2, Xn, NG and S1-U interfaces.

As briefly mentioned, a CU can host higher-layer protocols such as RRC and PDCP, while a DU can host lower-layer protocols such as RLC, MAC and PHY. Other variants of protocol distributions between CU and DU can exist, such as hosting the RRC, PDCP and part of the RLC protocol in CU (e.g., Automatic Retransmission Request (ARQ) function), while hosting the remaining parts of the RLC protocol in the DU, together with MAC and PHY. In some exemplary embodiments, CU can host RRC and PDCP, where PDCP is assumed to handle both UP traffic and CP traffic. Nevertheless, other exemplary embodiments may utilize other protocol splits that by hosting certain protocols in CU and certain others in the DU. Exemplary embodiments can also locate centralized control plane protocols (e.g., PDCP-C and RRC) in a different CU with respect to the centralized user plane protocols (e.g., PDCP-U).

3GPP RAN WG3 has also stared working on a new open interface—referred to as "E1"—between the control plane (CU-CP) and the user plane (CU-UP) parts of CU. The related agreements are collected in TR 38.806 and discussed further below.

In the architecture identified by CUs and DUs, DC can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

As mentioned above, multi-connectivity (e.g., dual-connectivity or "DC") is envisioned as an important feature to be supported in RAN 5G architectures. In this context, DC support includes establishing master (MN) and secondary nodes (SNs) and distributing UP traffic to the MN and SNs according to optimal, preferred, and/or desirable traffic and radio resource management techniques. CP traffic is assumed to terminate in one node only, i.e. the MN. FIGS. 2 and 3 below show the protocol and interfaces involved in DC, as described in 3GPP TS 38.300v0.6.0. FIG. 2 illustrates that a Master gNB (MgNB) can forward PDCP bearer traffic to a Secondary gNB (SgNB), while FIG. 3 illustrates a scenario where the SgNB can forward PDCP bearer traffic to the MgNB. In some exemplary embodiments, the MgNB and/or SgNB can be subject to the RAN split architecture (e.g., CU and DU) discussed above.

Furthermore, multi-RAT dual connectivity (MR-DC) can also be envisioned as an important feature in 5G RAN architectures. When MR-DC is applied, the MN can anchor the control plane towards the CN, while the SN can provide control and user plane resources to the UE via coordination with the MN. This is illustrated in FIG. 4 below, which is extracted from 3GPP TS 37.340. FIG. 5 shows various user-plane (UP) bearer types and corresponding protocol stack configurations for MR-DC, as further described in 3GPP TS 37.340.

Although the figures and discussion above are in the context of 5G, NG-RAN nodes can provide both NR access via gNBs and E-UTRA (also known as "LTE") access via evolved Node B's (eNBs). Many features for connectivity, mobility, support of QoS, etc. apply for both NR/SG and E-UTRA/LTE access. As such, any feature described for gNBs can also apply to eNBs, which are often referred to in this context as "ng-eNB." For example, it is anticipated that higher/lower layer split described above for gNBs will also be used for ng-eNBs.

In Long-Term Evolution (LTE), also referred to as "4G", delta-configuration can be utilized to reduce the size of the RRC messages that are sent over the radio interface, which improves both efficiency and performance. For example, a smaller RRC handover command message (i.e., RRC-Connection-Reconfiguration with Mobility Control Info) may significantly reduce the probability of handover failure, especially in the case of intra-frequency handover. To perform delta-configuration, the target node should receive the configuration of the UE in the source node. As such, the target node can generate an RRC message that contains only the delta with respect to the received UE configuration. In the procedures for the gNB-CU/DU architecture of NG-RAN, described in 3GPP TS 38.401, there is currently no support for delta-configuration. This is because there is no mechanism for sending the configuration of the UE from the source node (source gNB-DU) to the target node (target gNB-DU).

Furthermore, it is expected that the NG-RAN split CU-DU architecture exemplified by FIG. 1 and the various dual-connectivity (DC) configurations exemplified by FIGS. 2-5 can create difficulties for delta-configuration in NG-RAN including, for example, with respect to mobility signalling e.g., for handover).

SUMMARY OF EXEMPLARY EMBODIMENTS

Accordingly, exemplary embodiments of the present disclosure address these shortcomings in NG-RAN networks, thereby facilitating the sending of a UE configuration from a source gNB-DU to a target gNB-DU in an NG-RAN. Such exemplary embodiments can include methods and/or procedures performed by a central unit (CU, e.g., gNB-CU or MgNB). The CU, together with first and second DUs, can comprise a node of a wireless communication network.

The exemplary methods and/or procedures can include receiving from the first DU, prior to occurrence of a first event concerning a UE that is in communication with the first DU, a lower-layer configuration of the UE. The exemplary methods and/or procedures can also include storing the lower-layer configuration of the UE. The exemplary methods and/or procedures can also include sending, to the second DU, a setup request comprising the stored lower-layer configuration of the UE. The exemplary methods and/or procedures can also include receiving, from the second DU, a setup response comprising a first delta configuration indicating one or more differences between a lower-layer configuration of the second DU and the stored lower-layer configuration. The exemplary methods and/or procedures can also include sending, to the first DU, a modification request comprising the first delta configuration.

In some embodiments, the exemplary methods and/or procedures can include determining to trigger the first event based on one or more measurements received from the first DU. In some exemplary embodiments, sending the setup request message can be in response to determining to trigger the first event. In some exemplary embodiments, the first event can a mobility event or a dual-connectivity event.

In some exemplary embodiments, the modification request can further include a second delta configuration indicating one or more differences between higher-layer configurations of the UE with respect to the first and the second DUs. In some embodiments, the exemplary methods and/or procedures can further include generating the second delta configuration.

In some embodiments, the exemplary methods and/or procedures can include sending a context setup request to the first DU, where the lower-layer configuration of the UE can be received in response to the context setup request. In some embodiments, the exemplary methods and/or procedures can include sending a request, to the first DU, for the lower-layer configuration of the UE in response to one or more measurements made by the UE that were received from the first DU.

In some embodiments, the exemplary methods and/or procedures can include receiving one or more neighbor-cell measurements made by the UE and determining a further lower-layer configuration of the UE based on the received neighbor-cell measurements, where the setup request can include the further lower-layer configuration.

In some exemplary embodiments, the lower-layer configuration of the UE can include the Radio Resource Management (RRM) configuration used by the first DU with respect to the UE and/or the access stratum configuration used by the first DU with respect to the UE.

Other exemplary embodiments can include methods and/or procedures performed by a second DU (e.g., gNB-DU or SgNB). The second DU, together with a CU and a first DU, can comprise a node of a wireless communication network. The exemplary methods and/or procedures can include receiving, from the CU in response to a first event, a setup request comprising a lower-layer configuration of a UE in communication with the first DU prior to the first event. The exemplary methods and/or procedures can also include determining a first delta configuration indicating one or more differences between a lower-layer configuration of the second DU and the received lower-layer configuration the UE. The exemplary methods and/or procedures can also include sending, to the CU, a setup response comprising the first delta configuration.

In some exemplary embodiments, the first event can be one of a mobility event and a dual-connectivity event. In some exemplary embodiments, the lower-layer configuration of the UE can include the RRM configuration used by the first DU with respect to the UE and/or the access stratum configuration used by the first DU with respect to the UE.

Other exemplary embodiments can include methods and/or procedures performed by a first DU (e.g., gNB-DU or SgNB). The first DU, together with a CU and a second DU, can comprise a node of a wireless communication network. The exemplary methods and/or procedures can include sending to the CU, in advance of occurrence of a first event concerning a UE that is in communication with the first DU, a lower-layer configuration of the UE. The exemplary methods and/or procedures can include receiving, from the CU, a modification request comprising a first delta configuration indicating one or more differences between a lower-layer configuration of the second DU and the lower-layer configuration of the UE. The exemplary methods and/or procedures can include sending, to the UE, a modification request comprising the first delta configuration.

In some exemplary embodiments, the first event can be one of a mobility event and a dual-connectivity event. In some exemplary embodiments, the lower-layer configuration of the UE can include the RRM configuration used by the first DU with respect to the UE and/or the access stratum configuration used by the first DU with respect to the UE.

In some exemplary embodiments, the modification request can further include a second delta configuration indicating one or more differences between higher-layer configurations of the UE with respect to the first and the second DUs.

In some embodiments, the exemplary methods and/or procedures can include receiving a context setup request from the CU, where the lower-layer configuration of the UE can be sent in response to the context setup request.

In some embodiments, the exemplary methods and/or procedures can include sending, to the CU, one or more measurements made by the UE, and receiving, from the CU, a request for the lower-layer configuration of the UE subsequent to sending the one or more measurements.

Exemplary embodiments can also include network nodes or units of a network node (e.g., gNB-CU, gNB-DU, MgNB, or SgNB) configured to perform operations of the above-described exemplary methods and/or procedures. Other exemplary embodiments include non-transitory, computer-readable media storing computer-executable instructions that, when executed by a processing circuit comprising any such network nodes (or units thereof), configure the network node (or unit thereof) to perform operations of the above-described exemplary methods and/or procedures.

BRIEF DESCRIPTION OF THE DRAWINGS

FIG. 16-19 are flow diagrams illustrating various exemplary methods and/or procedures implemented in a communication system, according to various exemplary embodiments of the present disclosure.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Figure 1:
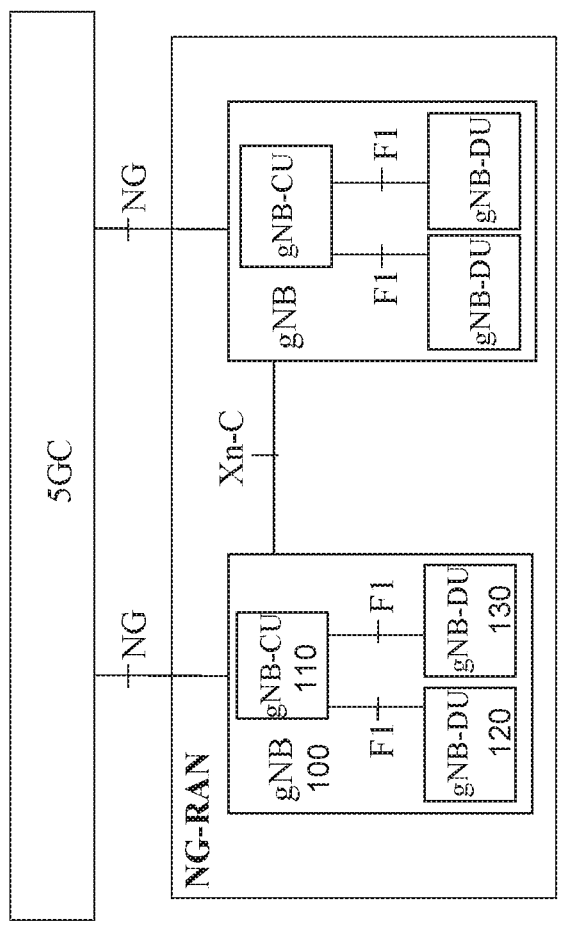
FIG. 1 illustrates a high-level view of an exemplary 5G network architecture, consisting of a Next Generation RAN (NG-RAN) and a 5G Core (5GC)
Figure 2:
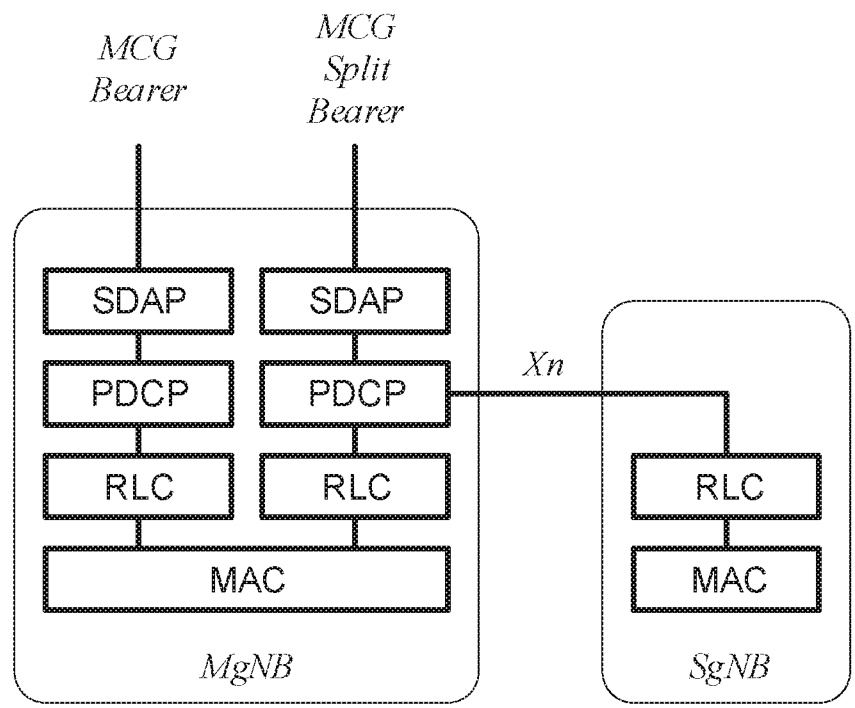
FIG. 2 illustrates an exemplary dual-connectivity (DC) configuration in which a Master gNB (MgNB) can forward user-plane (UP, e.g., PDCP-layer) bearer traffic to a Secondary gNB (SgNB)
Figure 3:
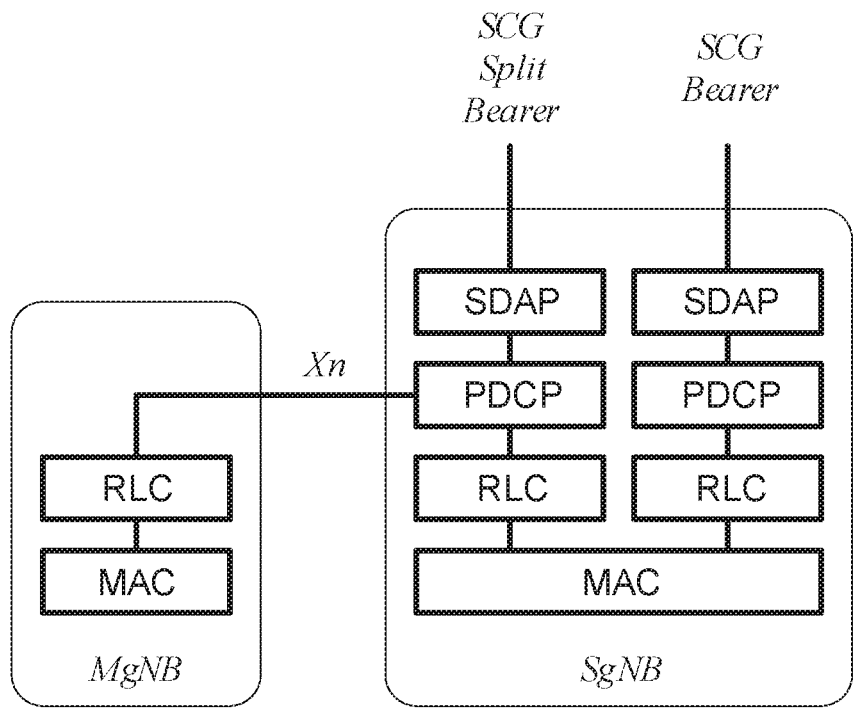
FIG. 3 illustrates an exemplary DC configuration in which a SgNB can forward UP bearer traffic to a MgNB.
Figures 4, 5:
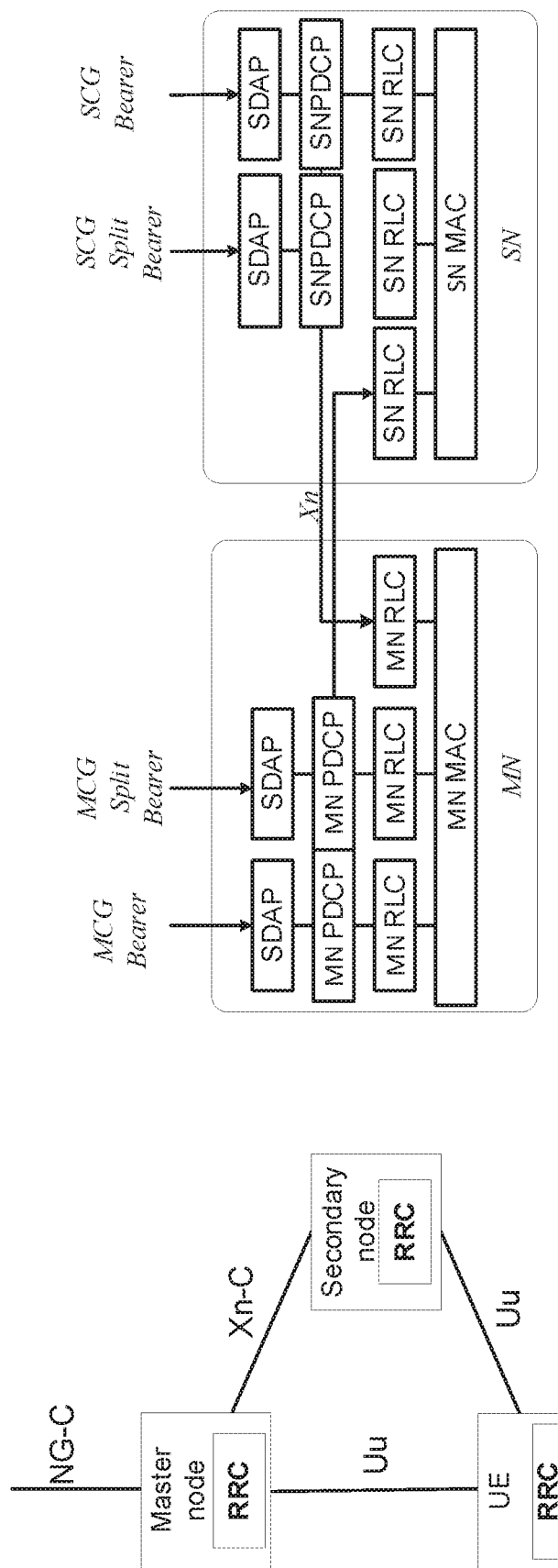
FIG. 4 shows an exemplary multi-RAT DC (MR-DC) configuration in which a master node (MN) anchors a control plane (CP) between a core network (CN) and a user equipment (UE)
FIG. 5 shows various exemplary user-plane (UP) bearer types and corresponding protocol stack configurations for MR-DC.

As briefly mentioned above, it is expected that the NG-RAN split CU-DU architecture exemplified by FIG. 1 and the various dual-connectivity (DC) configurations exemplified by FIGS. 2-5 can create difficulties for delta-configuration in NG-RAN including, for example, with respect to mobility signalling (e.g., for handover). This is discussed in more detail below.

If a delta-configuration mechanism similar to that used in LTE was applied to NG-RAN, an impact on mobility performance would be likely. For example, in the NG-RAN split architecture, the gNB-DU hosting the low layers configuration (e.g., for RLC/MAC/PHY protocols) is different from the gNB-CU generating the mobility signaling. If, like in LTE, a source gNB-DU had to provide low layer configuration to the target gNB-DU as part of UE mobility preparation, the information would need to be signaled from source gNB-DU to source gNB-CU, then from source gNB-CU to target gNB-CU, and then from target gNB-CU to target gNB-DU. In comparison, for LTE, the source-to-target configuration information needs to travel only from source eNB to target eNB.

As such, NG-RAN mobility may be affected by long handover preparation delays. These delays can cause frequent radio link failures due to the UE having moved out of coverage by the time the handover preparation has been completed. Other similar failures due to UE mobility during handover preparation and before handover execution can also occur. Similar problems can be encountered during configuration of dual connectivity (DC) for the UE. If the nodes involved in the DC configuration require long times to exchange their respective low layer configurations, the UE might have moved in locations where the DC configuration is inefficient and/or inappropriate.

Exemplary embodiments of the present disclosure address these problems by providing mechanisms that enable, facilitate, and/or support delta-configuration in the split gNB-CU/DU architecture while reducing and/or minimizing signaling delays. Such exemplary embodiments can send a UE configuration directly to a target gNB-DU, so that a delta configuration (e.g., delta-RRC) message can be generated. Such exemplary embodiments can be utilized in, but are not limited to, dual-connectivity and mobility procedures.

These exemplary embodiments can provide benefits including, e.g., reduced size of RRC messages over the air interface, delivery of the delta configuration to the UE in short time spans, and increased NG-RAN efficiency and performance due, e.g., to lower probability of handover failures. These and other advantages and/or benefits can facilitate more timely design, implementation, and deployment of 5G/NR solutions. Furthermore, these and other advantages and/or benefits can lead to improvements in capacity, throughput, latency, etc. that are envisioned by 5G/NR and are important for the growth of over-the-top (OTT) data applications or services external to the 5G network. Moreover, these and other advantages and/or benefits can also lead to improved user experience associated with OTT data applications or services, particularly with respect to service mobility within the 5G network.

For explanatory convenience, and without limitation, exemplary embodiments of the present disclosure can be divided into two general categories or groups of embodiments. The first category embodies the operational principle of a gNB-CU retrieving a configuration of lower layers from a source gNB-DU.

In such embodiments, for example, the gNB-CU can contact the source gNB-DU and retrieve the current lower-layer configuration for the UE via a new UE-associated procedure over the F1 interface. The gNB-CU can retrieve the source gNB-DU configuration ahead of a mobility or DC event. This can be done by monitoring the measurements reported by the LT, via the gNB-DU, to the gNB-CU and predicting that mobility or DC preparation is needed. By fetching the source gNB-DU configuration ahead of time, the mobility/DC configuration delay will not affect the overall performance of the procedure. Alternatively, the gNB-DU can send an update to gNB-CU whenever the gNB-DU does something that it considers needed for the gNB-CU in the future.

In such embodiments, the gNB-CU can also send the current lower-layer configuration of the UE to the target gNB-DU. For example, the lower-layer configuration can be included in an RRC container in an F1AP UE Context Setup Request message. Such lower layer configuration can include source gNB-DU to target gNB-DU information such as:

1) Radio Resource Management (RRM) configuration used by the source gNB-DU to serve the UE, which can include: UE inactivity timers; policies for scheduling, and more generally, for traffic handling.
2) Access Stratum Configuration (e.g. PHY layer resource configuration) used by the source gNB-DU, which can include:
   a. Source measurement configuration
   b. Source Radio Resource Configuration
   c. Source Security Algorithm Configuration
   d. Source DL Carrier Frequency
   e. Information about the Antenna configuration at source, e.g. number of antenna ports
   f. Master Information Block signaled by the source cell Additionally lower-layer configuration information can include parts that are elaborated by the gNB-CU, for example, on the basis of measurement reports received from the UE (via the source gNB-DU). For example, the information can include a list of re-establishment cells, e.g., cells the target gNB-DU should prepare in case the UE fails to connect to the target cell and attempts re-establishment on the source cell.

In such embodiments, the target gNB-DU can determine the new lower-layer configuration for the UE, and generate an RRC container that only includes the delta with respect to the configuration forwarded by the gNB-CU (e.g., the source gNB-DU configuration). The gNB-DU can send the RRC container to the gNB-CU over the F1 interface, e.g., in an F1AP UE Context Setup Response message.

In such embodiments, the gNB-CU can add and encode information such that the final RRC message can include: (1) delta of the lower-layer configuration generated by the target gNB-DU; and (2) delta of the higher-layer configuration that is generated directly by the gNB-CU. The higher-layer configuration generated by the gNB-CU can include, e,g., configuration of the PDCP and (if present) the SDAP protocol. In NR, the higher-layer configuration is included in the RRC IE RB-Config (radio bearer configuration) that is defined in 3GPP TS 38.331. The higher-layer configuration can also include the measurement configuration for the UE. Finally, the gNB-CU can send the RRC message comprising such information over the air to the UE.

The second category of exemplary embodiments is based on the operational principle that the gNB-CU stores the lower-layer configuration for the UE. In such embodiments, for example, the gNB-CU stores the lower-layer configuration of the UE that is generated by the source gNB-DU. For example, information described above as comprising the source gNB-DU lower-layer configuration can be signaled in advance by the source gNB-DU to the gNB-CU, which can then store the received configuration. The gNB-DU can also acquire UE measurements of neighbor cells, which it can use to determine other information, such as described above with respect to the other category of embodiments.

The gNB-CU can also forward the received UE measurements to the target gNB-DU, so that the target gNB-DU is aware of the cells measured by the UE before the mobility or DC configuration is activated. The latter UE measurement forwarding is applicable also in the previous method. In this way, the gNB-CU does not need to contact the source gNB-DU and it can directly contact the target gNB-DU. As such, this arrangement can provide a significant reduction in signaling delays.

In other respects, the second category of embodiments can operate in a manner similar as the first category. For example, the gNB-CU can also send the current lower-layer configuration of the UE to the target gNB-DU, e.g., in an RRC container in an F1AP UE Context Setup Request message comprising information described in detail above. Likewise, the target gNB-DU can also determine the new lower-layer configuration for the UE, and generate an RRC container that only includes the delta with respect to the configuration forwarded by the gNB-CU. In the same manner as described above, the gNB-CU can also add and encode information such that the final RRC message can include the delta of the lower-layer configuration generated by the target gNB-DU, as well as the delta of the higher-layer configuration that is generated directly by the gNB-CU.

Figure 6:
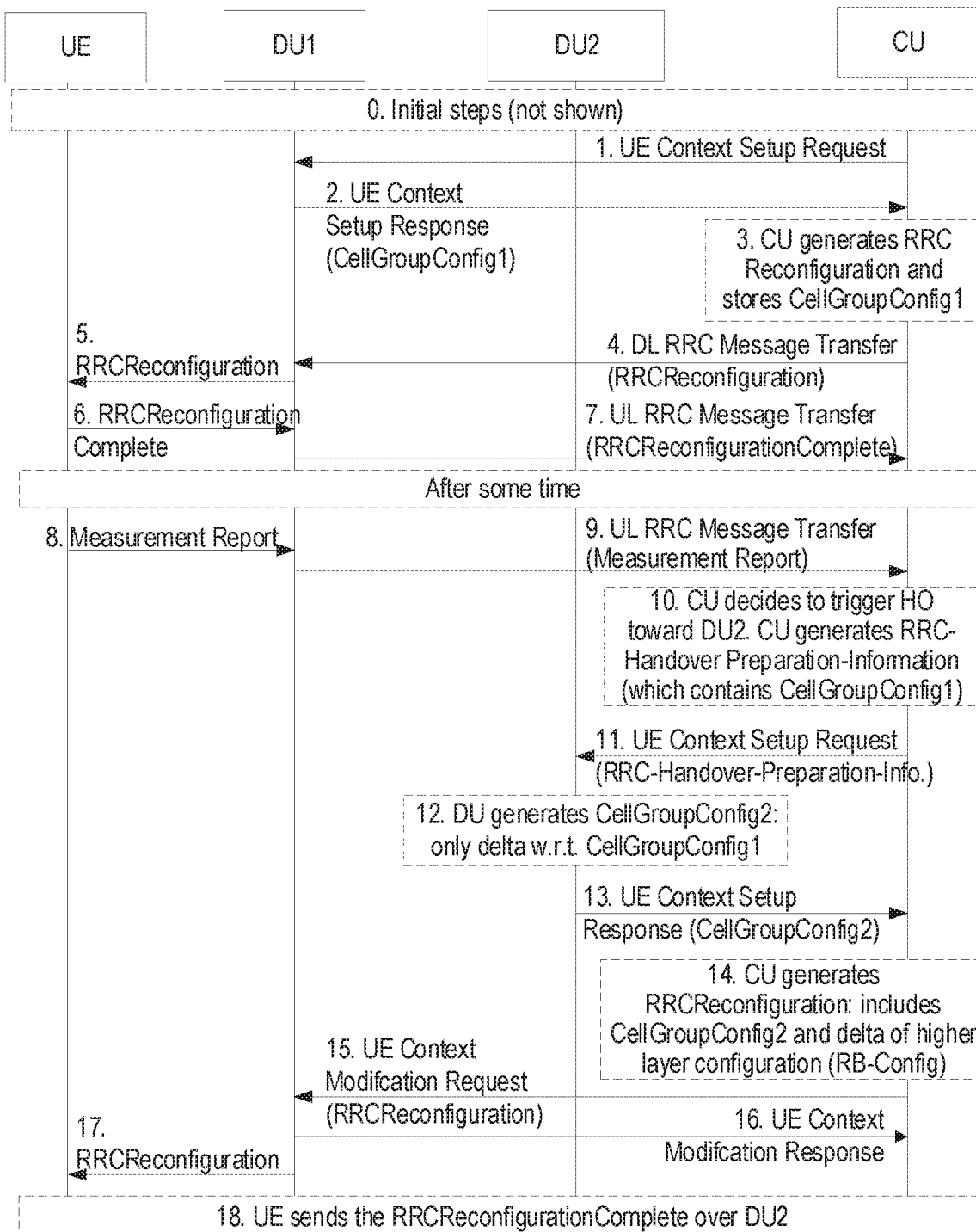
FIG. 6 illustrates an exemplary information flow among elements of a NG-RAN comprising a DU-CU split architecture for supporting inter-gNB-DU handover using delta-configuration, according to some exemplary embodiments of the present disclosure.
Figure 7:
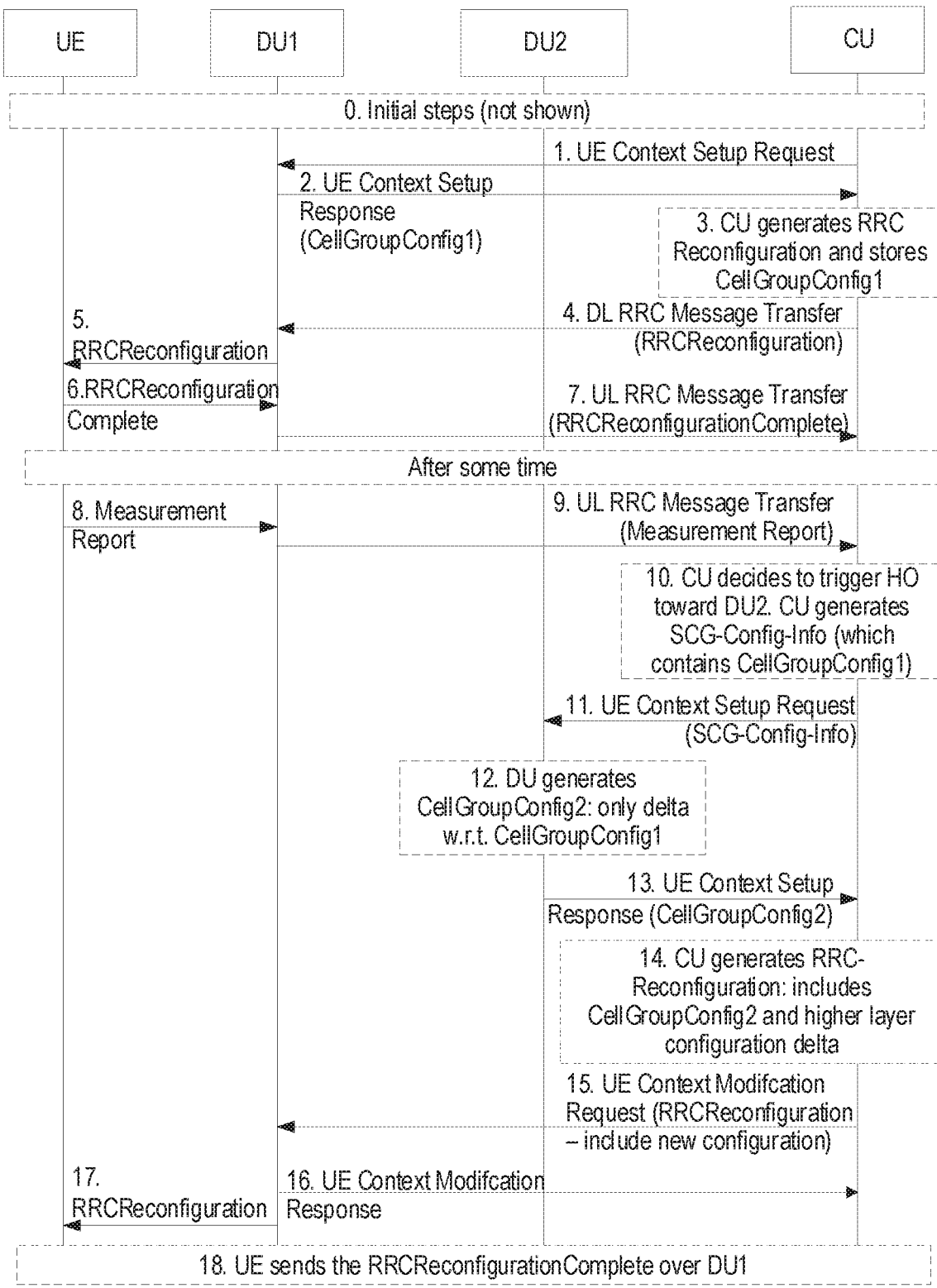
FIG. 7 illustrates an exemplary information flow among elements of a NG-RAN comprising a DU-CU split architecture for supporting dual connectivity using delta-configuration, according to some exemplary embodiments of the present disclosure.

Operation of the second category of exemplary embodiments is further illustrated by FIGS. 6-7 and their accompanying descriptions. FIG. 6 illustrates an exemplary information flow among elements of a NG-RAN comprising a DU-CU split architecture for supporting inter-gNB-DU handover using delta-configuration, according to some exemplary embodiments of the present disclosure. In the figure and the following description, various operations are given numerical labels or designations. However, this is for convenience only and should not be interpreted as limiting the operations to occur in any particular numerical order.

The following is a description of the operations of FIG. 6. In this description, each numbered operation corresponds to the same numbered item in FIG. 6.

0. The UE attaches to DU1 and CU. The details of these steps are shown in TS38.401 and are not reported here because they are not relevant for this disclosure.
1. CU sends UE CONTEXT SETUP REQUEST to DU1 to create a UE context.
2. DU1 generates a lower-layer configuration (CellGroupConfig1) for the UE, DU1 sends CellGroupConfig1 to CU in the UE CONTEXT SETUP RESPONSE message.
3. CU generates the RRC-Reconfiguration message that includes CellGroupConfig1. In addition, CU stores CellGroupConfig1.
4. CU sends a DL RRC MESSAGE TRANSFER to DU1 including the RRC-Reconfiguration message.
5. DU1 sends RRC-Reconfiguration message to the UE.
6. The UE applies the configuration indicated in RRC-Reconfiguration and it replies with RRC-Reconfiguration-Complete.
7. DU1 sends a UL RRC MESSAGE TRANSFER to CU including the RRC-Reconfiguration-Complete message.
At this point, the UE is configured to transmit/receive data via DU1. The following operations can happen at any point in time after the UE is configured to transmit/receive data via DU1.
8. The UE sends a measurement report to DU1.
9. DU1 sends a UL RRC MESSAGE TRANSFER to CU including the measurement report.
10. Based on the content of the measurement report, CU decides to trigger a handover toward DU2. CU generates the RRC-handover-information container. The container can include CellGroupConfig1. The container can also include additional information, such as the measurement report, higher-layer configuration (RB-Config) and measurement configuration. In general the container can include the information mentioned in the methods above, i.e. the source low layer configuration and the information deduced by CU based on UE measurements.
11. CU sends a UE CONTEXT SETUP REQUEST to DU2 that includes the RRC-handover-information container.
12. DU2 generates a new lower-layer configuration (CellGroupConfig2) for the UE. The CellGroupConfig2 contains only the information that are different with respect to CellGroupConfig1 (i.e., the delta with respect to CellGroupConfig1).
13. DU2 sends UE CONTEXT SETUP RESPONSE to CU that includes the CellGroupConfig2 container.
14. CU generates RRC-Reconfiguration (HO command) message. The RRC-Reconfiguration message includes: (1) CellGroupConfig2 (delta of the lower-layer configuration) and (2) RB-Config2 (generated by CU—delta of the higher-layer configuration).

Note: Operations 12 and 14 could also be performed in parallel before operation 13. After operation 13, operation 15 can be done when CU has finished building the RRC signal.

15. CU sends a UE CONTEXT MODIFICATION REQUEST to DU1 including the RRC-Reconfiguration (HO command) message. The message also includes a transmission stop indicator, to inform DU1 about the ongoing handover.
16. DU1 replies with UE CONTEXT MODIFICATION REQUEST to CU.
17. DU1 sends RRC-Reconfiguration (HO command) message to UE.
18. UE applies the new configuration (delta with respect to the previous configuration) and it attaches to DU2.

FIG. 7 illustrates an exemplary information flow among elements of a NG-RAN comprising a DU-CU split architecture for supporting dual connectivity (DC) using delta-configuration, according to some exemplary embodiments of the present disclosure. In the figure and the following description, various operations are given numerical labels or designations. However, this is for convenience only and should not be interpreted as limiting the operations to occur in any particular numerical order.

The following is a description of the operations of FIG. 7. In this description, each numbered operation corresponds to the same numbered item in FIG. 7. In the above flow, operations 1-9 and 12-13 are substantially the same as in the exemplary flow shown in FIG. 6, and their explanations are omitted below. After operation 7, the UE is configured to transmit/receive data via DU1. In operations 8-9, the UE sends a measurement report to the CU.

10. CU decides to setup DU2 as a secondary leg. CU generates SCG-Config-Info container, which includes CellGroupConfig1.

In some exemplary embodiments, before operation 10, CU can send a UE CONTEXT MODIFICATION REQUEST to the DU1, informing that DC is going to be activated. In operation 10, DU1 then generates a new CellGroupConfig1 and sends it to the CU. The new CellGroupConfig1 is optimized for supporting DC. The CU can include the new CellGroupConfig1 (optimized for DC) in the SCG-Config-Info container.

In some exemplary embodiments, during Context Modification or any equivalent procedure in which gNB-CU is involved with the gNB-DU1 prior to DC configuration, the UE capabilities can be updated and exchanged with gNB-DU1 and gNB-DU2. In one such exemplary embodiment, gNB-CU can trigger a UE Context Modification procedure as specified above with gNB-DU1. The gNB-CU can derive the UE capabilities that gNB-DU can relay on the basis of the planned DC configuration. That can be achieved at gNB-CU because gNB-CU is aware of the configuration (e.g. the bearers to be established, the radio resource needed, the bit rates required, etc.) to be applied at gNB-DU2. With that gNB-CU can derive a set of UE capabilities gNB-DU1 can use and send them to gNB-DU1 at e.g. UE context Modification. The gNB-CU can send the remaining UE capabilities that the gNB-DU2 can use to gNB-DU2 via message 11 (UE context Setup) or any equivalent message.

In another such exemplary embodiment, gNB-CU can perform a UE context Modification Request towards gNB-DU1. The gNB-DU1 has the full UE capabilities previously received from gNB-CU, and can therefore deduce the UE capabilities that it can use to send to gNB-CU a set of UE capabilities that gNB-DU2 can then access and use. This exemplary embodiments leaves deduction of UE capabilities to be used by gNB-DU1 and gNB-DU2 to gNB-DU1.

The remaining operations in FIG. 7 are described as follows:

14. gNB-CU generates the RRC-Reconfiguration message with the new DC configuration for the UE.
15-16. UE Context Modification is performed to update the configuration of gNB-DU1 and to send the RRC-Reconfiguration message to gNB-DU1.
17. gNB-DU1 sends the RRC-Reconfiguration message to the UE. Subsequently, the UE is connected and can transmit/receive data via both gNB-DU1 and gNB-DU2.

Figure 8:
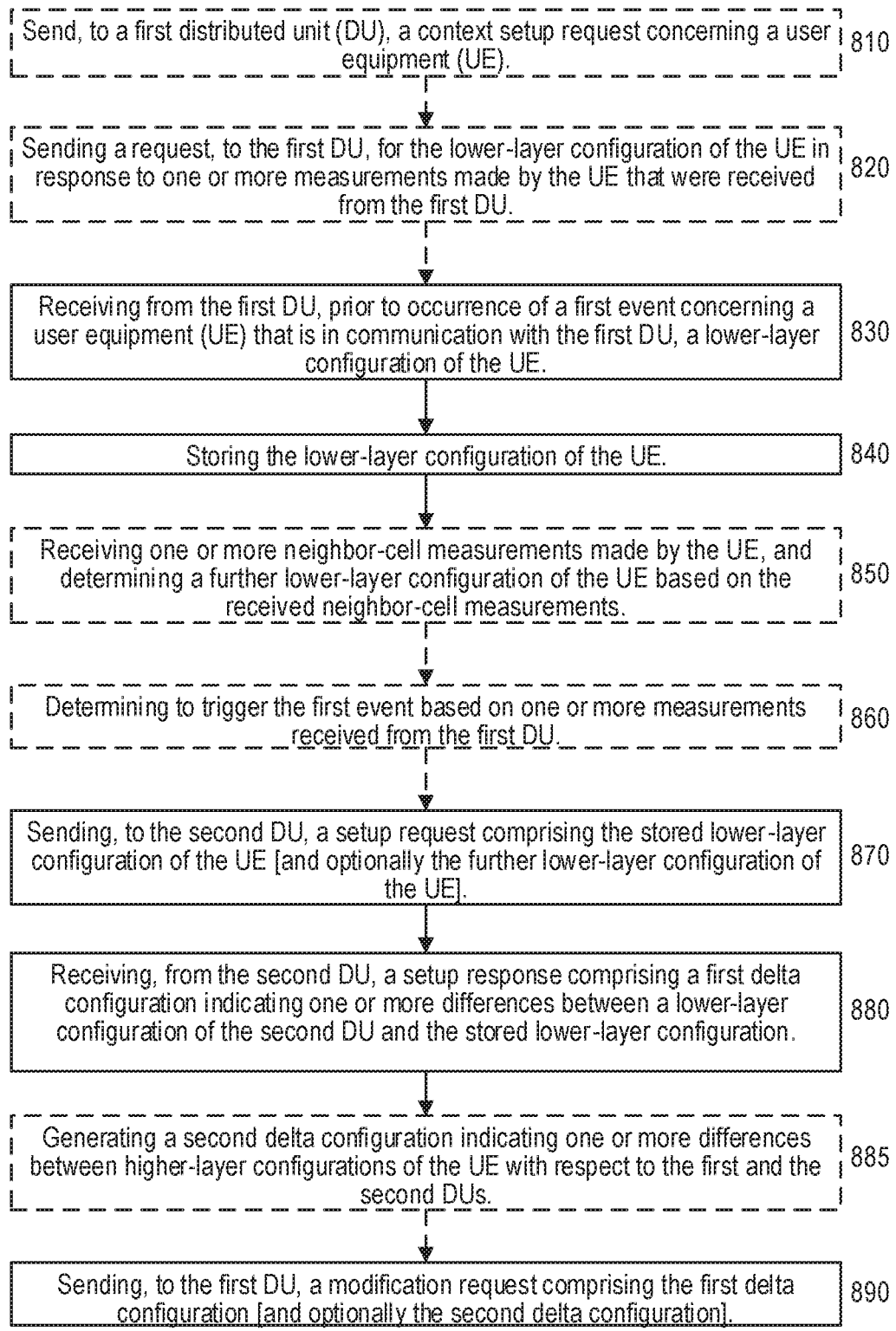
FIG. 8 is a flow diagram of an exemplary method and/or procedure performed by a central unit (CU) of anode in a wireless network, according to various exemplary embodiments of the present disclosure.
Figure 9:
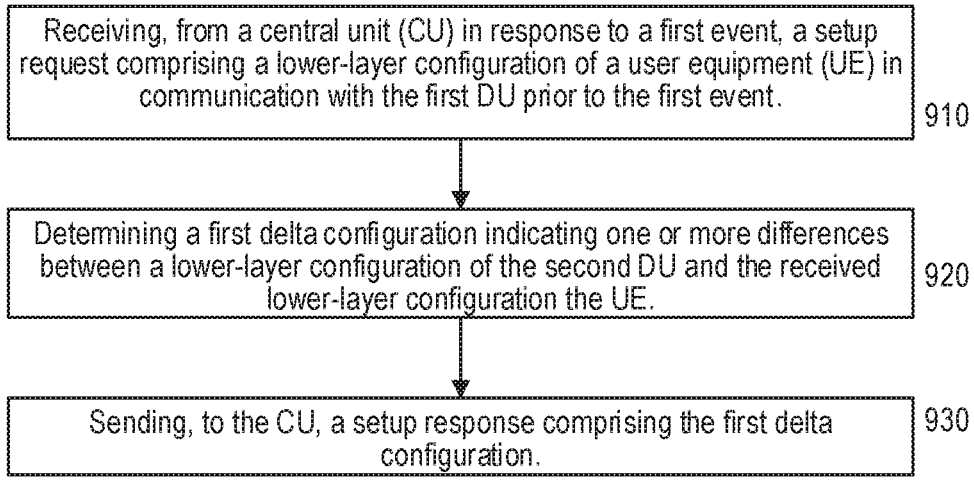
FIG. 9 is a flow diagram of an exemplary method and/or procedure performed by a second distributed unit (DU) of a node in a wireless network, according to various exemplary embodiments of the present disclosure.
Figure 10:
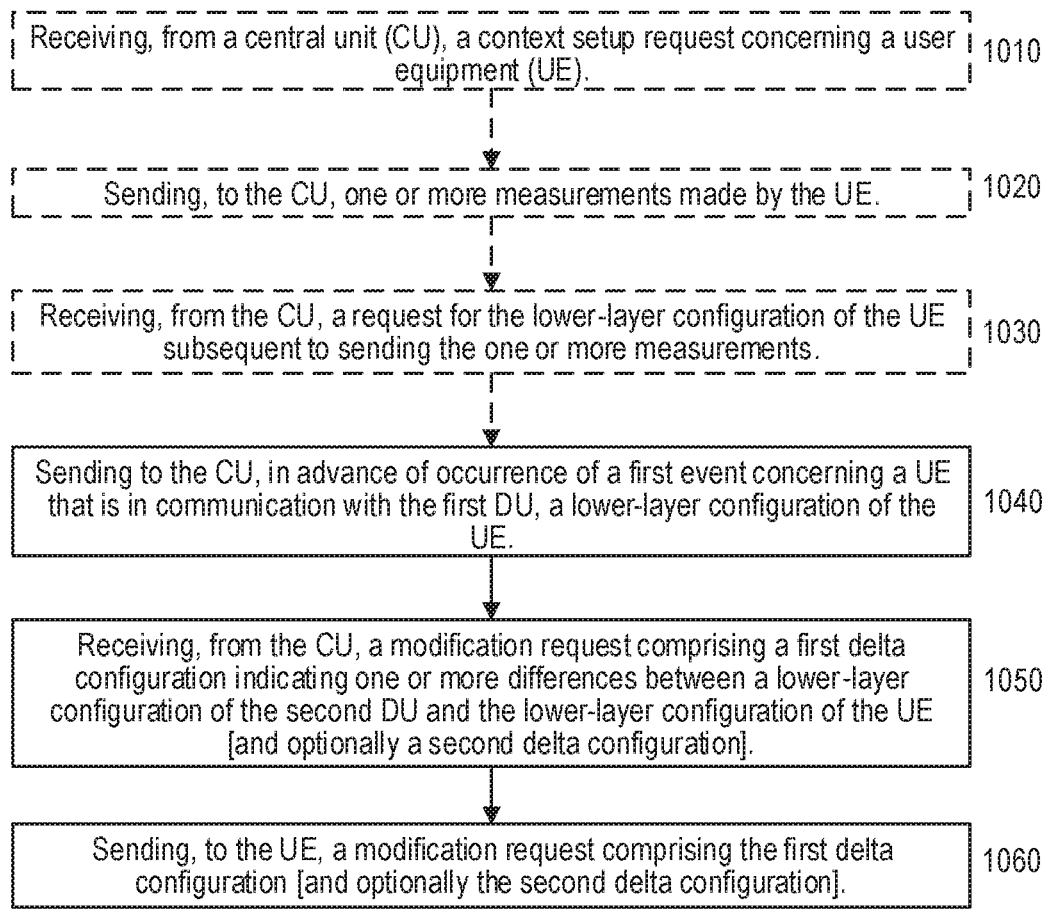
FIG. 10 is a flow diagram of an exemplary method and/or procedure performed by a first DU of a node in a wireless network, according to various exemplary embodiments of the present disclosure.

FIG. 8 illustrates an exemplary method and/or procedure performed by a central unit (CU, e.g., gNB-CU or MgNB) of a node in a wireless network, in accordance with various exemplary embodiments of the present disclosure. For example, together with first and second distributed units (DUs, e.g., gNB-DUs or SgNBs), the CU can comprise a base station, gNB, en-gNB, ng-eNB, etc. of a radio access network (RAN). Although the exemplary method and/or procedure is illustrated in FIG. 8 by blocks in a particular order, this order is exemplary and the operations corresponding to the blocks can be performed in different orders, and can be combined and/or divided into blocks having different functionality than shown in FIG. 8. Also, the exemplary method and/or procedure shown in FIG. 8 can be complimentary to the exemplary methods and/or procedures shown in FIGS. 9-10. In other words, the exemplary methods and/or procedures shown in FIGS. 8-10 are capable of being used cooperatively to provide the benefits, advantages, and/or solutions to problems described hereinabove. Optional operations are indicated by dashed lines.

In some embodiments, the exemplary method and/or procedure can include the operations of block 810, where the CU can send, to the first DU, a context setup request concerning the UE. In some embodiments, the exemplary method and/or procedure can include the operations of block 820, where the CU can send a request, to the first DU, for the lower-layer configuration of the UE in response to one or more measurements made by the UE that were received from the first DU.

The exemplary method and/or procedure can include the operations of block 830, where the CU can receive from the first DU, prior to occurrence of a first event concerning a UE that is in communication with the first DU, a lower-layer configuration of the UE. In embodiments that include the operations of blocks 810 and/or 820, the lower-layer configuration of the UE can be received in response to the particular request sent by the CU. In some exemplary embodiments, the received lower-layer configuration of the UE can include the RRM configuration used by the first DU with respect to the UE and/or the access stratum configuration used by the first DU with respect to the UE.

The exemplary method and/or procedure can also include the operations of block 840, where the CU can store the lower-layer configuration of the UE. In some embodiments, the exemplary methods and/or procedures can include the operations of block 8.50, where the CU can receive one or more neighbor-cell measurements made by the UE and determine a further lower-layer configuration of the UE based on the received neighbor-cell measurements. In some embodiments, the exemplary methods and/or procedures can include the operations of block 860, where the CU can determine to trigger the first event based on one or more measurements received from the first DU. In some exemplary embodiments, the first event can a mobility event or a dual-connectivity event.

The exemplary method and/or procedure can also include the operations of block 870, where the CU can send, to the second DU, a setup request comprising the stored lower-layer configuration of the UE. In embodiments that include the operations of block 850, the setup request can include the further lower-layer configuration. In embodiments that include the operations of block 860, sending the setup request message can be in response to determining to trigger the first event.

The exemplary method and/or procedure can also include the operations of block 880, where the CU can receive, from the second DU, a setup response comprising a first delta configuration indicating one or more differences between a lower-layer configuration of the second DU and the stored lower-layer configuration. The exemplary method and/or procedure can also include the operations of block 890, where the CU can send, to the first DU, a modification request comprising the first delta configuration.

In some exemplary embodiments, the exemplary methods and/or procedures can include the operations of block 885, where the CU can generate a second delta configuration indicating one or more differences between higher-layer configurations of the UE with respect to the first and the second DUs. In such embodiments, the modification request sent in block 890 can also include the second delta configuration.

FIG. 9 illustrates an exemplary method and/or procedure performed by a second distributed unit (DU, e.g., gNB-DU or SgNB) of a node in a wireless network, in accordance with various exemplary embodiments of the present disclosure. For example, together with a first DU and a central unit (C:U, e.g., gNB-CU or MgNB), the second DU can comprise a base station, gNB, en-gNB, ng-eNB, etc. of a radio access network (RAN). Although the exemplary method and/or procedure is illustrated in FIG. 9 by blocks in a particular order, this order is exemplary and the operations corresponding to the blocks can be performed in different orders, and can be combined and/or divided into blocks having different functionality than shown in FIG. 9. Also, the exemplary method and/or procedure shown in FIG. 9 can be complimentary to the exemplary methods and/or procedures shown in FIGS. 8 and 10. In other words, the exemplary methods and/or procedures shown in FIGS. 8-10 are capable of being used cooperatively to provide the benefits, advantages, and/or solutions to problems described hereinabove. Optional operations are indicated by dashed lines.

The exemplary method and/or procedure can include the operations of block 910, where the second DU can receive, from the CU in response to a first event, a setup request comprising a lower-layer configuration of a UE in communication with the first DU prior to the first event. The exemplary method and/or procedure can include the operations of block 920, where the second DU can determine a first delta configuration indicating one or more differences between a lower-layer configuration of the second DU and the received lower-layer configuration the UE. The exemplary method and/or procedure can include the operations of block 930, where the second DU can send, to the CU, a setup response comprising the first delta configuration.

In some exemplary embodiments, the first event can be one of a mobility event and a dual-connectivity event. In some exemplary embodiments, the lower-layer configuration of the UE can include the RRM configuration used by the first DU with respect to the UE and/or the access stratum configuration used by the first DU with respect to the UE.

FIG. 10 illustrates an exemplary method and/or procedure performed by a first distributed unit (DU, e.g., gNB-DU or SgNB) of a node in a wireless network, in accordance with various exemplary embodiments of the present disclosure. For example, together with a second DU and a central unit (CU, e.g., gNB-CU), the first DU can comprise a base station, gNB, en-gNB, ng-eNB, etc. of a radio access network (RAN). Although the exemplary method and/or procedure is illustrated in FIG. 10 by blocks in a particular order, this order is exemplary and the operations corresponding to the blocks can be performed in different orders, and can be combined and/or divided into blocks having different functionality than shown in FIG. 10. Also, the exemplary method and/or procedure shown in FIG. 10 can be complimentary to the exemplary methods and/or procedures shown in FIGS. 8-9. In other words, the exemplary methods and/or procedures shown in FIGS. 8-10 are capable of being used cooperatively to provide the benefits, advantages, and/or solutions to problems described hereinabove. Optional operations are indicated by dashed lines.

In some embodiments, the exemplary methods and/or procedures can include the operations of block 1010, where the first DU can receive a context setup request from the CU. In some embodiments, the exemplary methods and/or procedures can include the operations of block 1020, where the first DU can send, to the CU, one or more measurements made by the UE. In such embodiments, the exemplary methods and/or procedures can include the operations of block 1030, where the first DU can receive, from the CU, a request for the lower-layer configuration of the UE subsequent to sending the one or more measurements.

The exemplary method and/or procedure can include the operations of block 1040, where the first DU can send to the CU, in advance of occurrence of a first event concerning a UE that is in communication with the first DU, a lower-layer configuration of the UE. In the embodiments that include the operations of blocks 1010 and/or 1020, the lower-layer configuration of the UE can be sent in response to the particular received request. In some embodiments, the lower-layer configuration of the UE can include the RRM configuration used by the first DU with respect to the UE and/or the access stratum configuration used by the first DU with respect to the UE. In some exemplary embodiments, the first event can be one of a mobility event and a dual-connectivity event.

The exemplary method and/or procedure can also include the operations of block 1050, where the first DU can receive, from the CU, a modification request comprising a first delta configuration indicating one or more differences between a lower-layer configuration of the second DU and the lower-layer configuration of the UE. In some embodiments, the modification request can further include a second delta configuration indicating one or more differences between higher-layer configurations of the UE with respect to the first and the second DUs.

The exemplary method and/or procedure can also include the operations of block 1060, where the first DU can send, to the UE, a modification request comprising the first delta configuration. In some embodiments, the modification request can also include the second delta configuration.

Figure 11:
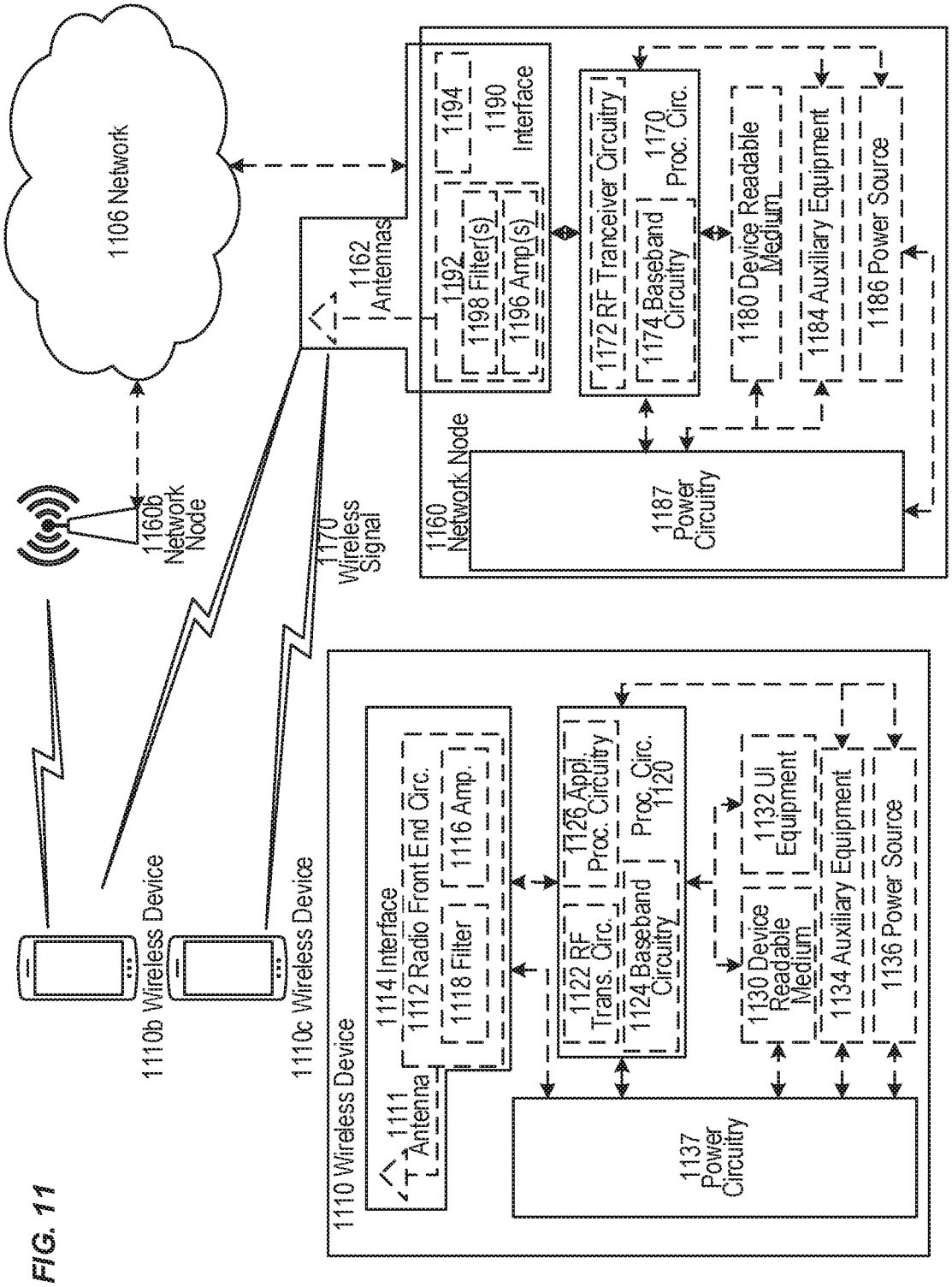
FIG. 11 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 11, network node 1160 can include processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that can include the illustrated combination of hardware components, other embodiments can comprise network nodes with different combinations of components. It is to be understood that a network node can comprise any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can comprise multiple physically separate components (e.g., a NodeB component and a RNC component, or a BTS component and a BSC component, etc.), which can each have their own respective components. In certain scenarios in which network node 1160 can comprise multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 can execute instructions stored in device readable medium 1180 or in memory within processing circuitry 1170. Such functionality can include providing any of the various wireless features, functions, or benefits discussed herein. In some embodiments, processing circuitry 1170 can include a system on a chip (SOC).

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signalling and/or data between network node 1160, network 1106, and/or WDs 1110. As illustrated, interface 1190 can comprise port(s)/terminal(s) 1194 to send and receive data, for example to and from network 1106 over a wired connection. Interface 1190 also can include radio front end circuitry 1192 that can be coupled to, or in certain embodiments a part of, antenna 1162. Radio front end circuitry 1192 can comprise filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna. 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 can include antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 can comprise radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality can include providing any of the various wireless features or benefits discussed herein. For example, processing circuitry 1120 can execute instructions stored in device readable medium 1130 or in memory within processing circuitry 1120 to provide the functionality disclosed herein.

As illustrated, processing circuitry 1120 can include one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110, and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network, and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
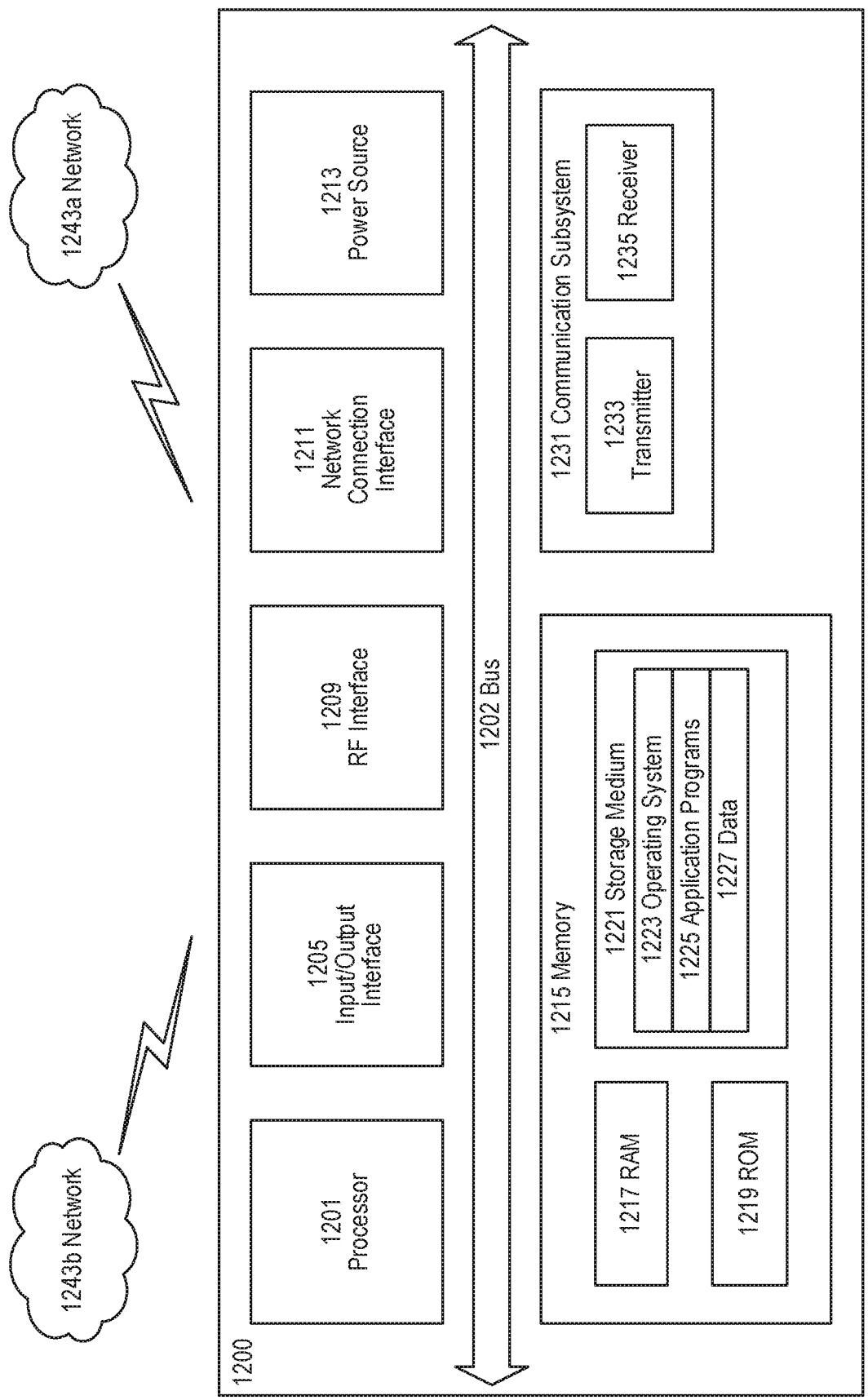
FIG. 12 is a block diagram of an exemplary user equipment (UE) configurable according to various exemplary embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but Which can be associated with or operated for the benefit of a user (e.g., a smart power meter). UE 12200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 can include processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 can include operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An Output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g, optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 can be configured to include operating system 1223, application program 1225 such as a web browser application, a widget or gadget engine or another application, and data file 1227. Storage medium 1221 can store, for use by UE 1200, any of a variety of various operating systems or combinations of operating systems.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD. UE, or base station of a radio access network (RAN) according to one or more communication protocols, such as IEEE 802.12, CDMA, WCDMA, GSM, UE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243*b* can encompass wired and/or wireless networks such as a local-area network (LAN), a wide-area network (WAN), a computer network, a wireless network, a telecommunications network, another like network or any combination thereof. For example, network 1243*b* can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
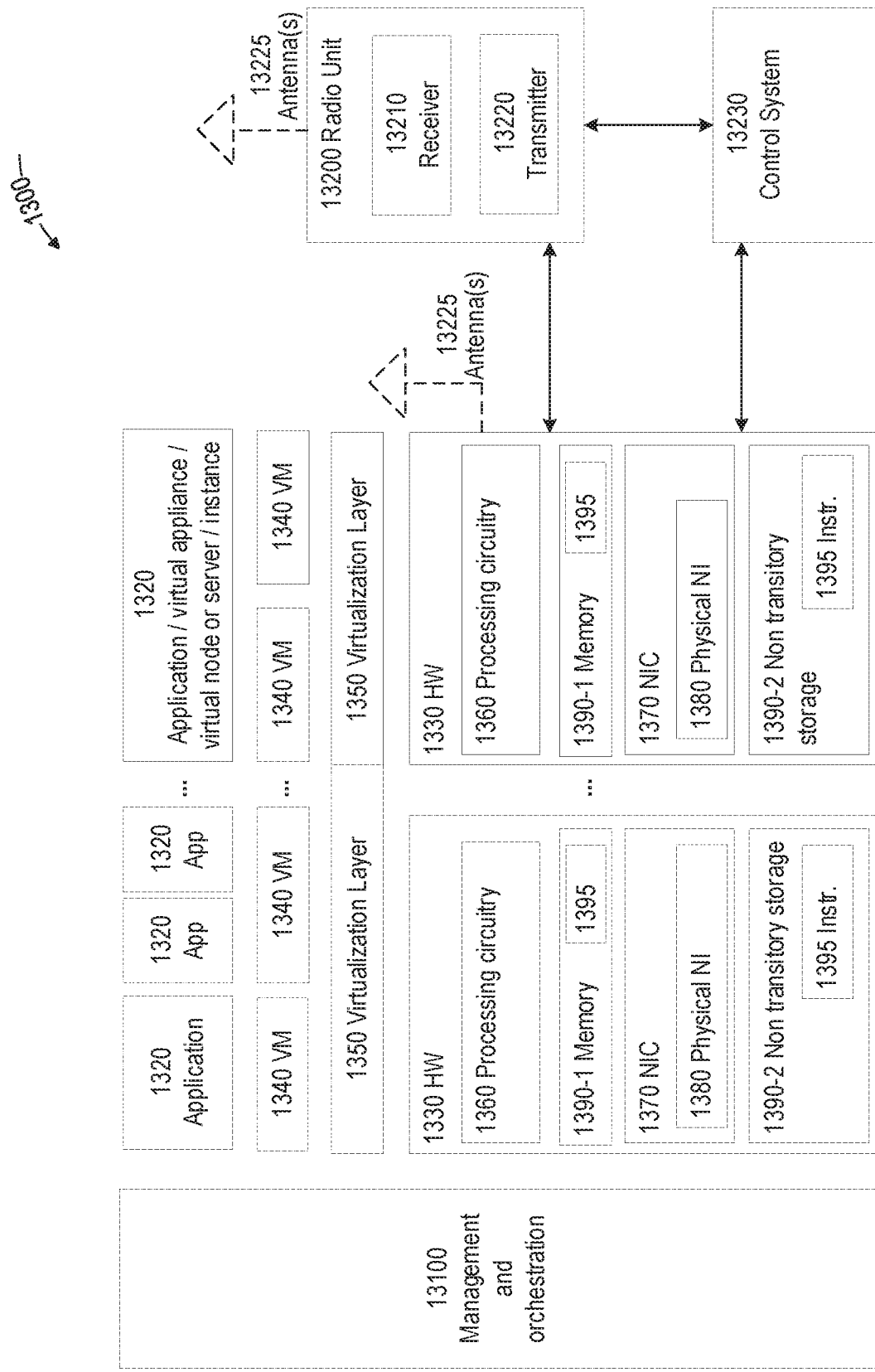
FIG. 13 is a block diagram of illustrating a virtualization environment that can facilitate virtualization of various functions implemented according to various exemplary embodiments of the present disclosure.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, can comprise general-purpose or special-purpose network hardware devices 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station.

In some embodiments, some signalling can be effected with the use of control system 13230 which can alternatively be used for communication between the hardware nodes 1330 and radio units 13200.

Figure 14:
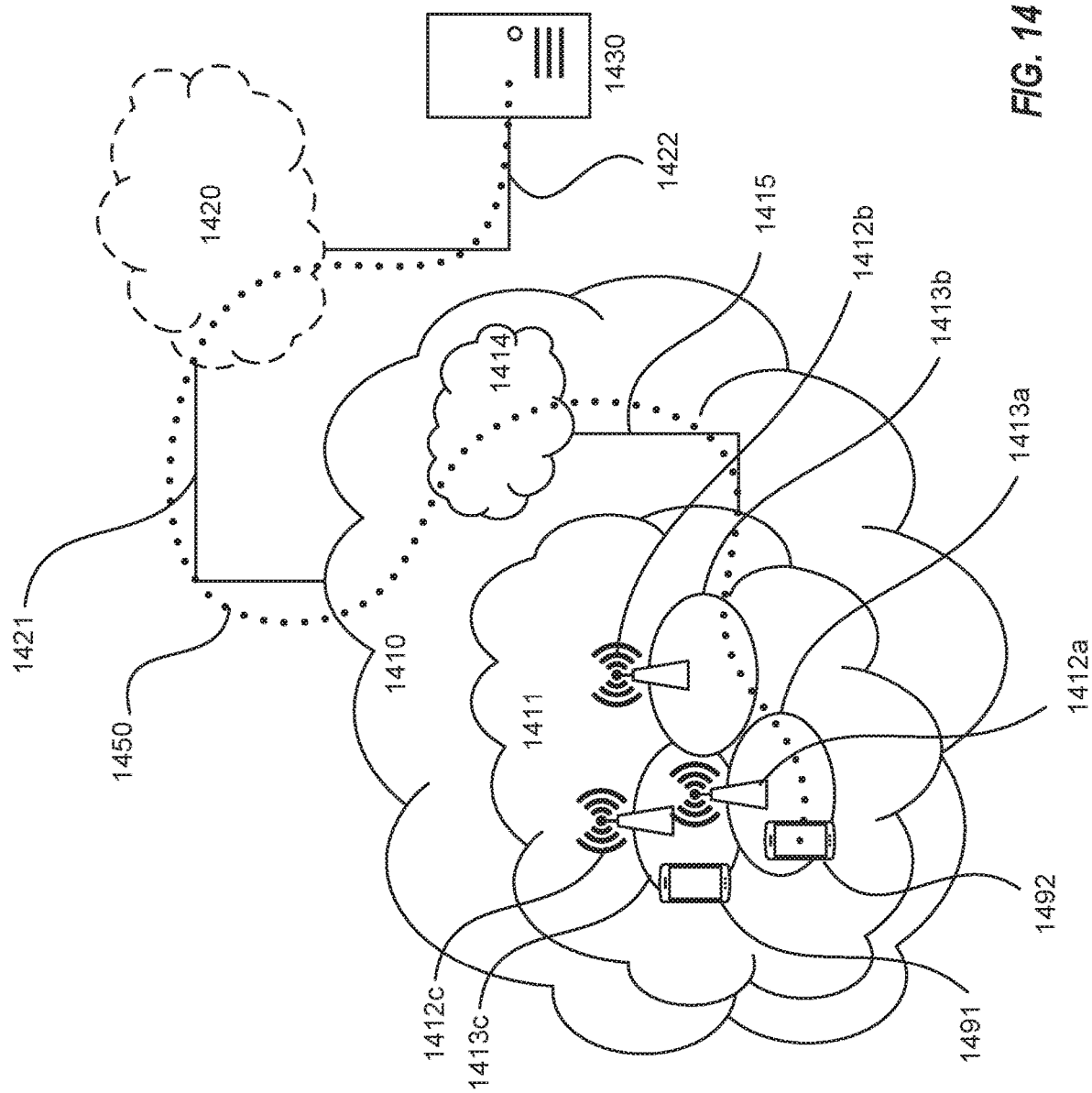
FIGS. 14-15 are block diagrams of exemplary communication systems configurable according to various exemplary embodiments of the present disclosure.

FIG. 14 shows a high-level diagram of a communication system, in accordance with various exemplary embodiments of the present disclosure. The communication system can include telecommunication network 1410, such as a 3GPP-type cellular network, which can comprise access network 1411, such as a radio access network, and core network 1414. Access network 1411 can comprise a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider, or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 can comprise hardware 1515 including communication interface 1516 configured to set up and maintain a wired or wireless connection with an interface of a different communication device of communication system 1500. Host computer 1510 can further comprise processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 can further comprise software 1511, which is stored in or accessible by host computer 1510 and executable by processing circuitry 1518. Software 1511 can include host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 can also include UE 1530 already referred to. Its hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions. UE 1530 can further comprise software 1531, which is stored in or accessible by UE 1530 and executable by processing circuitry 1538. Software 1531 can include client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides.

Figure 15:
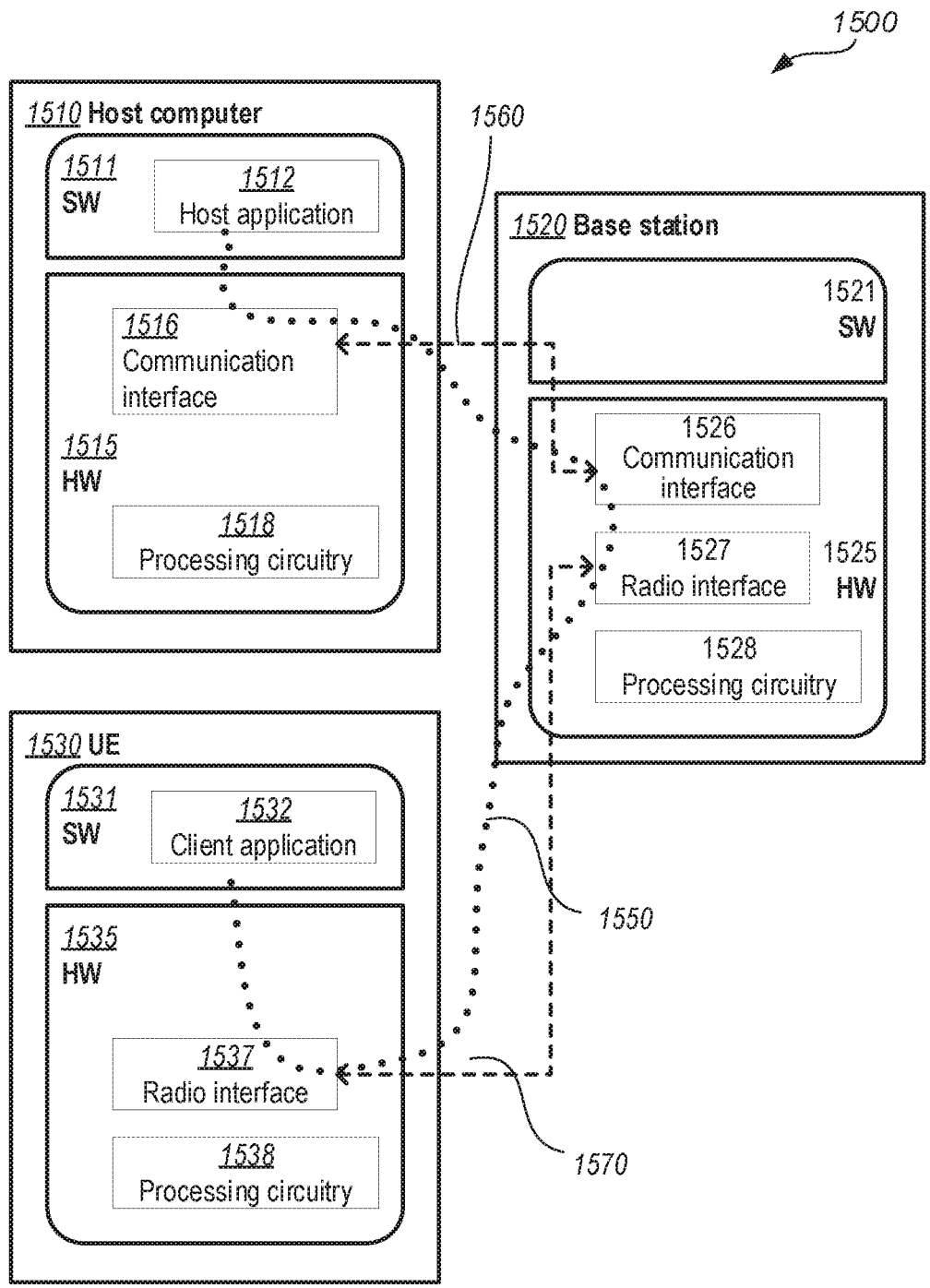

It is noted that host computer 1510, base station 1520 and IE 1530 illustrated in FIG. 15 can be similar or identical to host computer 1430, one of base stations 1412*a*, 1412*b*, 1412*c* and one of UEs 1491, 1492 of FIG. 14, respectively. This is to say, the inner workings of these entities can be as shown in FIG. 15 and independently, the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors etc.

FIG. 16 is a flowchart illustrating an exemplary method and/or procedure implemented in a communication system, in accordance with various embodiments of the present disclosure. The communication system includes a host computer, a base station and a UE which, in some exemplary embodiments, can be those described with reference to FIGS. QQ4 and QQ5. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with various embodiments of the present disclosure. The communication system includes a host computer, a base station and a. UE which can be those described with reference to FIGS. QQ4 and QQ5. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

Figures 18, 19:
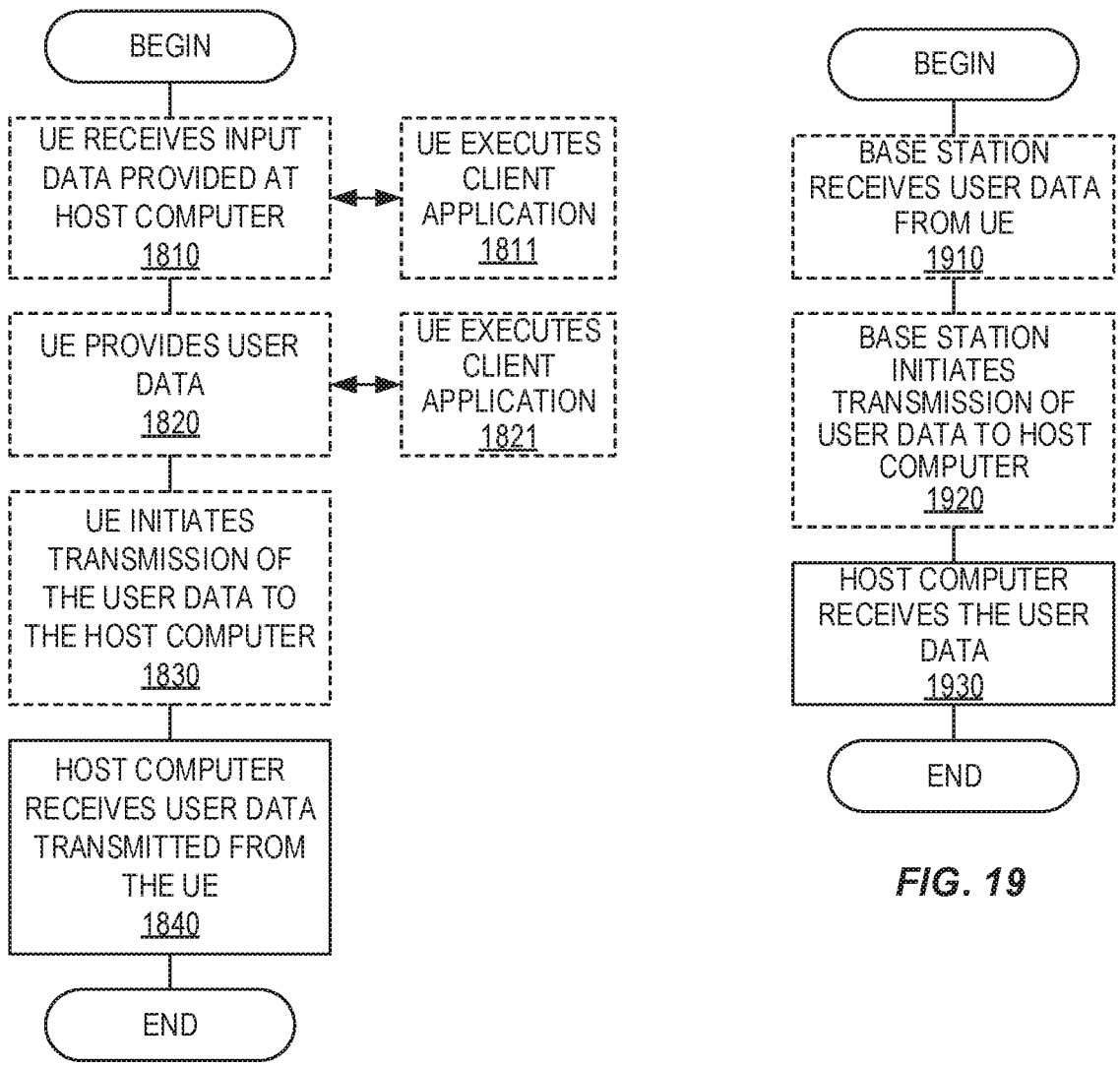

FIG. 18 is a flowchart illustrating an exemplary method and/or procedure implemented in a communication system, in accordance with various embodiments of the present disclosure. The communication system includes a host computer, a base station and a UE which can be those described with reference to FIGS. QQ4 and QQ5. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented in a communication system, in accordance with various embodiments of the present disclosure. The communication system includes a host computer, a base station and a UE which can be those described with reference to FIGS. QQ4 and QQ5. For simplicity of the present disclosure, only drawing references to FIG. 19 will be included in this section. In step 1910 (which can be optional), in accordance with the teachings of the embodiments described throughout this disclosure, the base station receives user data from the LTE. In step 1920 (which can be optional), the base station initiates transmission of the received user data to the host computer. In step 1930 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary embodiments of the present disclosure include the following enumerated embodiments.

1. A method performed by a central unit (CU) that, together with first and second distributed units (DUs), comprise a node of a wireless network, the method comprising:
    receiving from the first DU, prior to occurrence of a first event concerning a user equipment (UE) that is in communication with the first DU, a lower-layer configuration of the UE;
    storing the lower-layer configuration of the UE;
    sending, to the second DU, a setup request comprising the stored love aye configuration of the UE;
    receiving, from the second DU, a setup response comprising a first delta configuration indicating one or more differences between a lower-layer configuration of the second DU and the stored lower-layer configuration; and
    sending, to the first DU, a modification request comprising the first delta configuration,
2. The method of embodiment 1, further comprising determining to trigger the first event based on one or more measurements received from the first DU.
3. The method of any of embodiments 1-2, wherein sending the setup request message is in response to determining to trigger the first event.
4. The method of any of embodiments 1-3, wherein the first event is one of a mobility event and a dual-connectivity event.
5. The method of any of embodiments 1-4, wherein the modification request further includes a second delta configuration indicating one or more differences between higher-layer configurations of the UE with respect to the first and the second DUs.
6. The method of embodiment 4, further comprising generating the second delta configuration.
7. The method of any of embodiments 1-6, further comprising sending a context setup request to the first DU, wherein the lower-layer configuration of the UE is received in response to the context setup request.
8. The method of any of embodiments 1-6, further comprising sending a request, to the first DU, for the lower-layer configuration of the UE in response to one or more measurements made by the UE that were received from the first DU.
9. The method of any of embodiments 1-8, further comprising:
    receiving one or more neighbor-cell measurements made by the UE;
    determining a further lower-layer configuration of the UE based on the received neighbor-cell measurements, wherein the setup request comprises the further lower-layer configuration.
10. The method of any of embodiments 1-9, wherein the lower-layer configuration of the UE comprises at least one of: the Radio Resource Management (RRM) configuration used by the first DU with respect to the UE; and the access stratum configuration used by the first DU with respect to the UE.
11. A method performed by a second distributed unit (DU) that, together with a central unit (CU) and a first DU, comprise a node of a wireless network, the method comprising:
    receiving, from the CU in response to a first event, a setup request comprising a lower-layer configuration of a user equipment (UE) in communication with the first DU prior to the first event;
    determining a first delta configuration indicating one or more differences between a lower-layer configuration of the second DU and the received lower-layer configuration the UE; and
    sending, to the CU, a setup response comprising the first delta configuration.
12. The method of embodiment 11, wherein the first event is one of a mobility event and a dual-connectivity event.
13. The method of any of embodiments 11-13, wherein the lower-layer configuration of the UE comprises at least one of: the Radio Resource Management (RRM) configuration used by the first DU with respect to the UE; and the access stratum configuration used by the first DU with respect to the UE.
14. A method performed by a first distributed unit (DU) that, together with a central unit (CU) and a second DU, comprise a node of a wireless network, the method comprising:
    sending to the CU, in advance of occurrence of a first event concerning a user equipment (UE) that is in communication with the first DU, a lower-layer configuration of the UE;
    receiving, from the CU, a modification request comprising a first delta configuration indicating one or more differences between a lower-layer configuration of the second DU and the lower-layer configuration of the UE; and
    sending, to the UE, a modification request comprising the first delta configuration.
15. The method of embodiment 14, wherein the first event is one of a mobility event and a dual-connectivity event.
16. The method of any of embodiments 14-15, wherein the lower-layer configuration of the UE comprises at least one of: the Radio Resource Management (RRM) configuration used by the first DU with respect to the UE; and the access stratum configuration used by the first DU with respect to the UE.
17. The method of any of embodiments 14-16, wherein the modification request further includes a second delta configuration indicating one or more differences between higher-layer configurations of the UE with respect to the first and the second DUs.
18. The method of any of embodiments 14-17, further comprising receiving a context setup request from the CU, wherein the lower-layer configuration of the UE is sent in response to the context setup request.
19. The method of any of embodiments 14-17, further comprising:
   sending, to the CU, one or more measurements made by the UE; and
   receiving, from the CU, a request for the lower-layer configuration of the UE subsequent to sending the one or more measurements.
20. A central (CU) of a network node, comprising:
   processing circuitry configured to perform operations corresponding to any of the methods of embodiments 1-10; and
   power supply circuitry configured to supply power to the CU.
21. A second distributed unit (DU) of a network node, comprising:
   processing circuitry configured to perform operations corresponding to any of the methods of embodiments 11-13; and
   power supply circuitry configured to supply power to the second DU.
22. A first distributed unit (DU) of a network node, comprising:
   processing circuitry configured to perform operations corresponding to any of the methods of embodiments 14-19;
   power supply circuitry configured to supply power to the first DU.
23. A communication system including a host computer comprising:
   processing circuitry configured to provide user data; and
   a communication interface configured to forward the user data to a cellular network for transmission to a user equipment (UE),
   wherein the cellular network comprises a network node comprising a central unit (CU) and first and second distributed units (DUs), each of the first and second DUs having a radio interface and processing circuitry;
   the CU's processing circuitry is configured to perform operations corresponding to any of the methods of embodiments 1-10;
   the second DU's processing circuitry is configured to perform operations corresponding to any of the methods of embodiments 11-13; and
   the first DU's processing circuitry is configured to perform operations corresponding to any of the methods of embodiments 14-19.
24. The communication system of embodiment 23, further including a user equipment configured to communicate with at least one of the first and second DUs.
25. The communication system of any of embodiments 23-24, wherein:
   the processing circuitry of the host computer is configured to execute a host application, thereby providing the user data; and
   the UE comprises processing circuitry configured to execute a client application associated with the host application.
26. A method implemented in a communication system including a host computer, first and second distributed units (DUs), a central unit (CU), and a user equipment (UE), the method comprising:
   at the host computer, providing user data;
   at the host computer, initiating a transmission carrying the user data to the UE via a cellular network comprising the first and second DUs and the CU; and
   operations, performed by the CU, corresponding to any of the methods of embodiments 1-10;
   operations, performed by the second DU, corresponding to any of the methods of embodiments 11-13; and
   operations, performed by the first DU, corresponding to any of the methods of embodiments 14-19.
27. The method of embodiment 26, further comprising, transmitting the user data by at least one of the first and second DUs.
28. The method of any of embodiments 26-27, wherein the user data is provided at the host computer by executing a host application, the method further comprising, at the UE, executing a client application associated with the host application.
29. A communication system including a host computer comprising a communication interface configured to receive user data originating from a transmission from a user equipment (UE) to at least one of a first distributed unit (DU) and a second DU, wherein the second DU comprises a radio interface and processing circuitry configured to perform operations corresponding to any of the methods of embodiments 11-13, and wherein the first DU comprises processing circuitry configured to perform operations corresponding to any of the methods of embodiments 14-19.
30. The communication system of the previous embodiment further including the first and second DUs.
31. The communication system of embodiments 32 or 33, further including a central unit (CU) connected to the first and second DUs, the CU comprising processing circuitry configured to perform operations corresponding to any of the methods of embodiments 1-10.
32. The communication system of any of embodiments 29-31, further including the UE, wherein the UE is configured to communicate with at least one of the first and second DUs.
33. The communication system of any of embodiments 32-35, wherein:
   the processing circuitry of the host computer is configured to execute a host application;
   the UE is configured to execute a client application associated with the host application, thereby providing the user data to be received by the host computer.

What is claimed is:
1. A method performed by a central unit (CU) that together with first and second distributed units (DUs) comprise a node of a wireless communication network, the method comprising:
   receiving from the first DU, prior to occurrence of a first event concerning a user equipment (UE) that is in communication with the first DU, a lower-layer configuration of the UE;
   storing the received lower-layer configuration of the UE;
   sending, to the second DU, a setup request comprising the stored lower-layer configuration of the UE;
   receiving, from the second DU, a setup response comprising a first delta configuration indicating one or more differences between a lower-layer configuration of the second DU and the stored lower-layer configuration; and sending, to the first DU, a modification request comprising the first delta configuration and a second delta configuration indicating one or more differences between higher-layer configurations of the UE with respect to the first and the second DUs.

2. The method of claim 1, further comprising determining to trigger the first event based on one or more measurements made by the UE that are received from the first DU.

3. The method of claim 1, wherein sending the setup request message is in response to determining to trigger the first event.

4. The method of claim 1, wherein the first event is one of a mobility event and a dual-connectivity event.

5. The method of claim 1, further comprising generating the second delta configuration.

6. The method of claim 1, further comprising sending a context setup request to the first DU, wherein the lower-layer configuration of the UE is received in response to the context setup request.

7. The method of claim 1, further comprising sending a request, to the first DU, for the lower-layer configuration of the UE in response to one or more measurements made by the UE that were received from the first DU.

8. The method of claim 1, further comprising:
receiving one or more neighbor-cell measurements made by the UE;
determining a further lower-layer configuration of the UE based on the received neighbor-cell measurements, wherein the setup request comprises the further lower-layer configuration.

9. The method of claim 1, wherein the lower-layer configuration of the UE comprises at least one of the following:
a Radio Resource Management (RRM) configuration used by the first DU with respect to the UE; and
an access stratum configuration used by the first DU with respect to the UE.

10. A method performed by a first distributed unit (DU) that together with a central unit (CU) and a second DU comprise a node of a wireless communication network, the method comprising:
sending to the CU, in advance of occurrence of a first event concerning a user equipment (UE) that is in communication with the first DU, a lower-layer configuration of the UE;
receiving, from the CU after occurrence of a condition that triggers the first event, a modification request comprising a first delta configuration indicating one or more differences between a lower-layer configuration of the second DU and the lower-layer configuration of the UE; and
sending, to the UE, a modification request comprising the first delta configuration and a second delta configuration indicating one or more differences between higher-layer configurations of the UE with respect to the first and the second DUs.

11. The method of claim 10, wherein the first event is one of a mobility event and a dual-connectivity event.

12. The method of claim 10, wherein the lower-layer configuration of the UE comprises at least one of the following:
a Radio Resource Management (RRM) configuration used by the first DU with respect to the UE; and
an access stratum configuration used by the first DU with respect to the UE.

13. The method of claim 10, further comprising receiving a context setup request from the CU, wherein the lower-layer configuration of the UE is sent in response to the context setup request.

14. The method of claim 10, further comprising:
sending, to the CU, one or more measurements made by the UE; and
receiving, from the CU, a request for the lower-layer configuration of the UE subsequent to sending the one or more measurements.

15. A central unit (CU) of a network node configured for operation in a wireless communication network, the CU comprising:
processing circuitry; and
a computer-readable medium storing instructions that, when executed by the processing circuitry, configure the CU to:
receive from a first distributed unit (DU), prior to occurrence of a first event concerning a user equipment (UE) that is in communication with the first DU, a lower-layer configuration of a user equipment, UE; and
store the received lower-layer configuration of the UE;
send, to a second DU,
a setup request comprising the stored lower-layer configuration of the UE;
receive, from the second DU, a setup response comprising a first delta configuration indicating one or more differences between a lower layer configuration of the second DU and the stored lower-layer configuration; and
send, to the first DU, a modification request comprising the first delta configuration and a second delta configuration indicating one or more differences between higher-layer configurations of the UE with respect to the first and the second DUs.

16. The CU of claim 15, wherein execution of the instructions further configures the CU to determine to trigger the first event based on one or more measurements made by the UE that are received from the first DU.

17. The CU of claim 15, wherein execution of the instructions further configures the CU to send the setup request message in response to determining to trigger the first event.

18. The CU of claim 15, wherein the first event is one of a mobility event and a dual-connectivity event.

19. The CU of claim 15, wherein execution of the instructions further configures the CU to send a context setup request to the first DU, wherein the lower-layer configuration of the UE is received in response to the context setup request.

20. The CU of claim 15, wherein execution of the instructions further configures the CU to send a request, to the first DU, for the lower-layer configuration of the UE in response to one or more measurements made by the UE that were received from the first DU.

21. The CU of claim 15, wherein execution of the instructions further configures the CU to:
receive one or more neighbor-cell measurements made by the UE;
determine a further lower-layer configuration of the UE based on the received neighbor-cell measurements, wherein the setup request comprises the further lower-layer configuration.

22. The CU of claim 15, wherein the lower-layer configuration of the UE comprises at least one of the following:
  a Radio Resource Management (RRM) configuration used by the first DU with respect to the UE; and
  an access stratum configuration used by the first DU with respect to the UE.

23. A first distributed unit (DU) of a network node configured for operation in a wireless communication network, the first DU comprising:
  processing circuitry; and
  a computer-readable medium storing instructions that, when executed by the processing circuitry, configure the first DU to:
    send to a central unit (CU), in advance of occurrence of a first event concerning a user equipment (UE) that is in communication with the first DU, a lower-layer configuration of the UE;
    receive, from the CU, a modification request comprising a first delta configuration indicating one or more differences between a lower-layer configuration of the second DU and the lower-layer configuration of the UE; and
    send, to the UE, a modification request comprising the first delta configuration and a second delta configuration indicating one or more differences between higher-layer configurations of the UE with respect to the first and the second DUs.

24. The first DU of claim 23, wherein the first event is one of a mobility event and a dual-connectivity event.

25. The first DU of claim 23, wherein the lower-layer configuration of the UE comprises at least one of the following:
  a Radio Resource Management, RRM, configuration used by the first DU with respect to the UE; and
  an access stratum configuration used by the first DU with respect to the UE.

26. The first DU of claim 23, wherein execution of the instructions further configures the first DU to receive a context setup request from the CU, wherein the lower-layer configuration of the UE is sent in response to the context setup request.

27. The first DU of claim 23, wherein execution of the instructions further configures the first DU to:
  send, to the CU, one or more measurements made by the UE; and
  receive, from the CU, a request for the lower-layer configuration of the UE subsequent to sending the one or more measurements.

\* \* \* \* \*